United States Patent
Uhlig et al.

(10) Patent No.: US 11,971,958 B1
(45) Date of Patent: *Apr. 30, 2024

(54) AUTONOMOUS VEHICLE MODEL TRAINING AND VALIDATION USING LOW-DISCREPANCY SEQUENCES

(71) Applicant: GHOST AUTONOMY INC., Mountain View, CA (US)

(72) Inventors: Volkmar Uhlig, Cupertino, CA (US); Par Botes, Atherton, CA (US)

(73) Assignee: GHOST AUTONOMY INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/340,788

(22) Filed: Jun. 23, 2023

Related U.S. Application Data

(63) Continuation of application No. 18/189,781, filed on Mar. 24, 2023, which is a continuation-in-part of application No. 17/740,888, filed on May 10, 2022.

(51) Int. Cl.
    *G06F 18/232*     (2023.01)
    *G06N 3/08*     (2023.01)
    *G06N 20/00*     (2019.01)

(52) U.S. Cl.
    CPC ............. *G06F 18/232* (2023.01); *G06N 3/08* (2013.01); *G06N 20/00* (2019.01)

(58) Field of Classification Search
    CPC ......... G06F 18/232; G06N 3/08; G06N 20/00
    See application file for complete search history.

(56) References Cited

U.S. PATENT DOCUMENTS

| | | | |
|---|---|---|---|
| 6,643,641 B1 | 11/2003 | Snyder | |
| 11,010,691 B1 | 5/2021 | Chen et al. | |
| 11,501,042 B2 | 11/2022 | Steingrimsson et al. | |
| 11,754,998 B2 * | 9/2023 | Zhao ..................... | G05B 11/36 |
| | | | 700/29 |
| 2015/0338550 A1 | 11/2015 | Wadsley | |
| 2021/0018590 A1 * | 1/2021 | Grau ............... | B60W 60/00186 |
| 2021/0117696 A1 * | 4/2021 | Hertlein ............... | G06V 20/653 |

(Continued)

OTHER PUBLICATIONS

Jian Cheng and Marek J. Druzdzel, "Computational Investigation of Low-Discrepancy Sequences in Simulation Algorithms for Bayesian Networks," Uncertainty in Artificial Intelligence Proceedings 2000, p. 72-81 (Year: 2000).*

*Primary Examiner* — Steven W Crabb

(57) ABSTRACT

Autonomous vehicle model training and validation using low-discrepancy sequences may include: generating a low-discrepancy sequence in a multidimensional space comprising a plurality of multidimensional points; mapping each sample of a plurality of samples of a data corpus to a corresponding entry in the low-discrepancy sequence, wherein each sample of the plurality of samples comprises one or more environmental descriptors for an environment relative to a vehicle and one or more state descriptors describing a state of the vehicle; selecting, from the data corpus, a training data set by selecting, for each multidimensional point of the low-discrepancy sequence having one or more mapped samples, a mapped sample for inclusion in the training data set; and training one or more models used to generate autonomous driving decisions of an autonomous vehicle based on the selected training data set.

20 Claims, 11 Drawing Sheets

(56) References Cited

U.S. PATENT DOCUMENTS

| | | | |
|---|---|---|---|
| 2022/0230072 A1* | 7/2022 | Gladisch | G06V 10/771 |
| 2022/0246241 A1 | 8/2022 | Acedo et al. | |
| 2022/0284294 A1* | 9/2022 | Keller | G06F 18/214 |
| 2022/0391766 A1* | 12/2022 | Acuna Marrero | G06N 20/00 |
| 2023/0092969 A1* | 3/2023 | Chang | G06F 18/2137 |
| | | | 706/15 |
| 2023/0105871 A1* | 4/2023 | Nichols | G01C 21/3804 |
| | | | 701/25 |

* cited by examiner

AUTONOMOUS VEHICLE MODEL TRAINING AND VALIDATION USING LOW-DISCREPANCY SEQUENCES

CROSS REFERENCE TO RELATED APPLICATIONS

This is a continuation application for patent entitled to a filing date and claiming the benefit of earlier-filed U.S. patent application Ser. No. 18/189,781, filed Mar. 24, 2023, which is a continuation-in-part of U.S. patent application Ser. No. 17/740,888, filed May 10, 2022, each of which are herein incorporated by reference in their entirety.

BACKGROUND

Field of the Invention

The field of the invention is autonomous vehicle systems, or, more specifically, methods, apparatus, and products for training and validating autonomous driving models.

SUMMARY

A data corpus may be mapped to a low-discrepancy sequence in a multidimensional space. The mapping may be used to select an event distribution of training data from the data corpus. Low-discrepancy sequences may also be used to generate evenly distributed sets of synthetic data usable in validating autonomous driving models.

Autonomous vehicle model training and validation using low-discrepancy sequences may include: generating a low-discrepancy sequence in a multidimensional space comprising a plurality of multidimensional points; mapping each sample of a plurality of samples of a data corpus to a corresponding entry in the low-discrepancy sequence, wherein each sample of the plurality of samples comprises one or more environmental descriptors for an environment relative to a vehicle and one or more state descriptors describing a state of the vehicle; selecting, from the data corpus, a training data set by selecting, for each multidimensional point of the low-discrepancy sequence having one or more mapped samples, a mapped sample for inclusion in the training data set; and training one or more models used to generate autonomous driving decisions of an autonomous vehicle based on the selected training data set.

The foregoing and other objects, features and advantages of the disclosure will be apparent from the following more particular descriptions of exemplary embodiments of the disclosure as illustrated in the accompanying drawings wherein like reference numbers generally represent like parts of exemplary embodiments of the disclosure.

DETAILED DESCRIPTION

The terminology used herein for the purpose of describing particular examples is not intended to be limiting for further examples. Whenever a singular form such as "a," "an," and "the" is used and using only a single element is neither explicitly nor implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes," and/or "including," when used, specify the presence of the stated features, integers, steps, operations, processes, acts, elements, and/or components, but do not preclude the presence or addition of one or more other features, integers, steps, operations, processes, acts, elements, components, and/or any group thereof. Additionally, when an element is described as "plurality," it is understood to mean two or more of such an element. However, as set forth above, further examples may implement the same functionality using a single element.

It will be understood that when an element is referred to as being "connected" or "coupled" to another element, the elements may be directly connected or coupled or via one or more intervening elements. If two elements A and B are combined using an "or," this is to be understood to disclose all possible combinations, i.e. only A, only B, as well as A and B. An alternative wording for the same combinations is "at least one of A and B." The same applies for combinations of more than two elements.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

Figure 1:
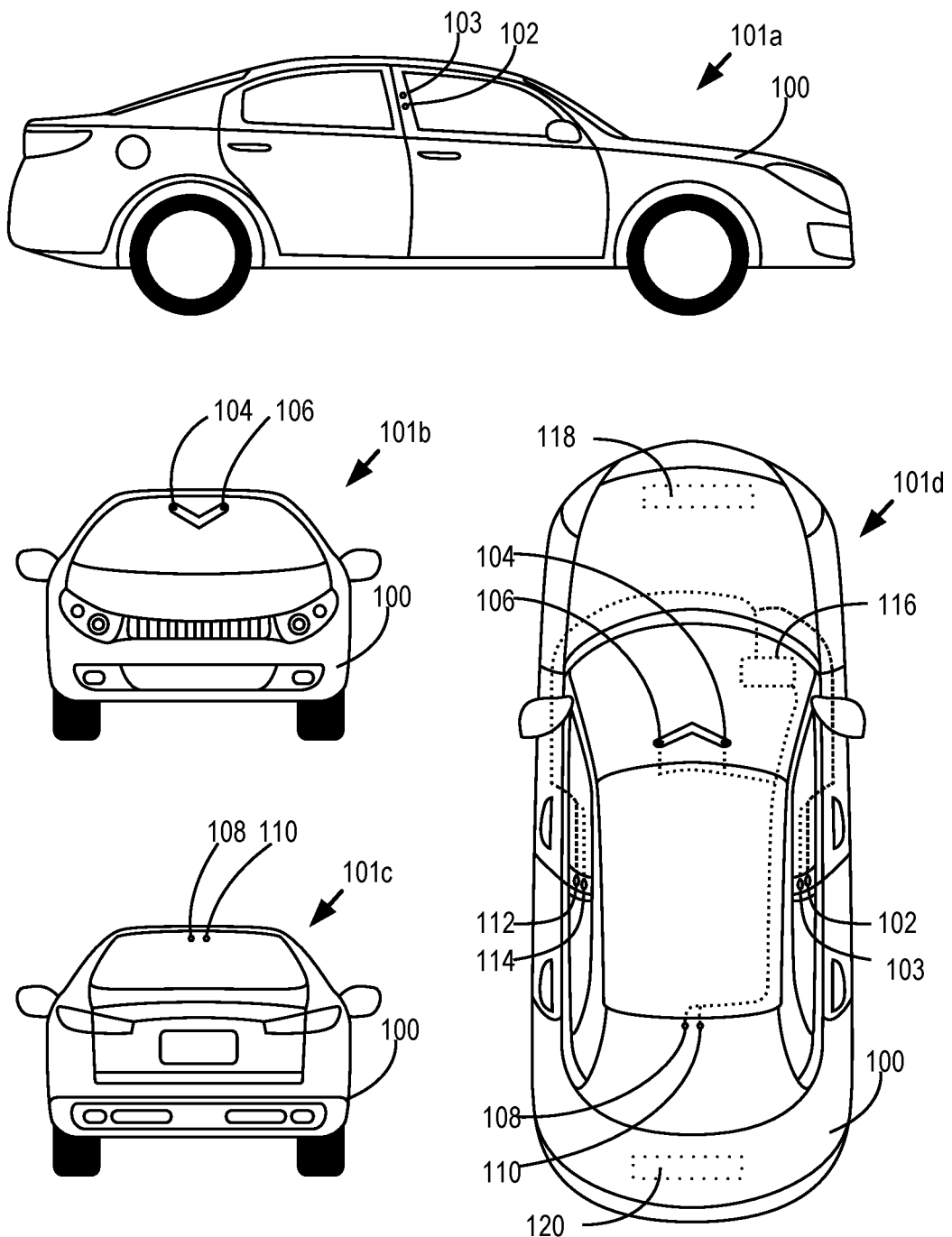
FIG. 1 shows example views of an autonomous vehicle for autonomous vehicle model training and validation using low-discrepancy sequences according to some embodiments of the present disclosure.

Autonomous vehicle model training and validation using low-discrepancy sequences may be implemented in an autonomous vehicle. Accordingly, FIG. 1 shows multiple views of an autonomous vehicle 100 configured for autonomous vehicle model training and validation using low-discrepancy sequences according to embodiments of the present disclosure. Right side view 101a shows a right side of the autonomous vehicle 100. Shown in the right-side view 101a are cameras 102 and 103, configured to capture image data, video data, and/or audio data of the environmental state of the autonomous vehicle 100 from the perspective of the right side of the car. Front view 101b shows a front side of the autonomous vehicle 100. Shown in the front view 101b are cameras 104 and 106, configured to capture image data, video data, and/or audio data of the environmental state of the autonomous vehicle 100 from the perspective of the front of the car. Rear view 101c shows a rear side of the autonomous vehicle 100. Shown in the rear view 101c are cameras 108 and 110, configured to capture image data, video data, and/or audio data of the environmental state of the autonomous vehicle 100 from the perspective of the rear of the car. Top view 101d shows a rear side of the autonomous vehicle 100. Shown in the top view 101d are cameras 102-110. Also shown are cameras 112 and 114, configured to capture image data, video data, and/or audio data of the environmental state of the autonomous vehicle 100 from the perspective of the left side of the car.

Further shown in the top view 101d is an automation computing system 116. The automation computing system 116 comprises one or more computing devices configured to control one or more autonomous operations (e.g., autonomous driving operations) of the autonomous vehicle 100. For example, the automation computing system 116 may be configured to process sensor data (e.g., data from the cameras 102-114 and potentially other sensors), operational data (e.g., a speed, acceleration, gear, orientation, turning direction), and other data to determine an operational state and/or operational history of the autonomous vehicle. The automation computing system 116 may then determine one or more operational commands for the autonomous vehicle (e.g., a change in speed or acceleration, a change in brake application, a change in gear, a change in turning or orientation). The automation computing system 116 may also capture and store sensor data. Operational data of the autonomous vehicle may also be stored in association with corresponding sensor data, thereby indicating the operational data of the autonomous vehicle 100 at the time the sensor data was captured.

Also shown in the top view 101d is a radar sensor 118. The radar sensor 118 uses radio waves to detect objects in the environment relative to the autonomous vehicle 100. The radar sensor 118 may also detect or track various attributes of such objects, including distance, velocity, angle of movement and the like. The measurements of the radar sensor 118 may be provided as sensor data (e.g., radar data) to the automation computing system 116.

The radar data from the radar sensor 118 may be used in a variety of ways to facilitate autonomous driving functionality. As an example, the radar sensor 118 may be used in isolation or in conjunction with other sensors, such as camera sensors, to track persistence of various objects. As described herein, persistence includes determining that a particular object identified at a particular instance (e.g., in camera sensor data, in radar sensor 118 data, or both) is the same object in subsequent instances. The radar sensor 118 may also facilitate detecting the size, shape, type, or speed of particular objects. These detected attributes may be correlated with or used to verify estimations of these attributes from camera sensors. As a further example, the radar sensor 118 may facilitate detecting voids in the environment where no object is present.

The radar sensor 118 provides several advantages over camera sensors in detecting the environment relative to the autonomous vehicle 100. For example, the radar sensor 118 provides for greater accuracy at longer distances. The radar sensor 118 may also provide for more accurate estimations of velocity or movement of objects. Moreover, as the radar sensor 118 does not operate in the optical spectrum, performance degradation of the radar sensor 118 in inclement weather is lesser than with camera sensors. Radar sensors 118 also provide some level of vertical resolution in some embodiments, with a tradeoff between distance and vertical resolution.

In some embodiments, the autonomous vehicle 100 may also include an additional radar sensor 120. For example, where the radar sensor 118 is positioned at a front bumper of the autonomous vehicle, the autonomous vehicle 100 may also include the additional radar sensor 120 positioned at the rear bumper. Such an additional radar sensor allows for multispectral (e.g., both visual and radar) coverage of the environment at the rear of the car. This provides advantages over ultrasonic sensors at the rear bumper which generally have a limited distance relative to radar.

Although the autonomous vehicle 100 if FIG. 1 is shown as car, it is understood that autonomous vehicles 100 configured for autonomous vehicle model training and validation using low-discrepancy sequences may also include other vehicles, including motorcycles, planes, helicopters, unmanned aerial vehicles (UAVs, e.g., drones), or other vehicles. Moreover, it is understood that additional cameras or other external sensors may also be included in the autonomous vehicle 100.

Autonomous vehicle model training and validation using low-discrepancy sequences in accordance with the present disclosure is generally implemented with computers, that is, with automated computing machinery. For further explanation, therefore, FIG. 2 sets forth a block diagram of automated computing machinery comprising an exemplary automation computing system 116 configured for autonomous vehicle model training and validation using low-discrepancy sequences according to specific embodiments. The automation computing system 116 of FIG. 2 includes at least one computer Central Processing Unit (CPU) package 204 as well as random access memory 206 (RAM') which is connected through a high-speed memory bus 208 and bus adapter 210 to CPU packages 204 via a front side bus 211 and to other components of the automation computing system 116.

A CPU package 204 may comprise a plurality of processing units. For example, each CPU package 204 may comprise a logical or physical grouping of a plurality of processing units. Each processing unit may be allocated a particular process for execution. Moreover, each CPU package 204 may comprise one or more redundant processing units. A redundant processing unit is a processing unit not allocated a particular process for execution unless a failure occurs in another processing unit. For example, when a given processing unit allocated a particular process fails, a redundant processing unit may be selected and allocated the given process. A process may be allocated to a plurality of processing units within the same CPU package 204 or different CPU packages 204. For example, a given process may be allocated to a primary processing unit in a CPU package 204. The results or output of the given process may be output from the primary processing unit to a receiving process or service. The given process may also be executed in parallel on a secondary processing unit. The secondary processing unit may be included within the same CPU package 204 or a different CPU package 204. The secondary processing unit may not provide its output or results of the process until the primary processing unit fails. The receiving process or service will then receive data from the secondary processing unit. A redundant processing unit may then be selected and have allocated the given process to ensure that two or more processing units are allocated the given process for redundancy and increased reliability.

The CPU packages 204 are communicatively coupled to one or more sensors 212. The sensors 212 are configured to capture sensor data describing the operational and environmental conditions of an autonomous vehicle. For example, the sensors 212 may include cameras (e.g., the cameras 102-114 of FIG. 1), accelerometers, Global Positioning System (GPS) radios, LiDAR sensors, or other sensors. As described herein, cameras may include a solid state sensor 212 with a solid-state shutter capable of measuring photons or a time of flight of photons. For example, a camera may be configured to capture or measure photons captured via the shutter for encoding as images and/or video data. As another example, a camera may emit photons and measure the time of flight of the emitted photons. Cameras may also include event cameras configured to measure changes in light and/or motion of light.

Although the sensors 212 are shown as being external to the automation computing system 116, it is understood that one or more of the sensors 212 may reside as a component of the automation computing system 116 (e.g., on the same board, within the same housing or chassis). The sensors 212 may be communicatively coupled with the CPU packages 204 via a switched fabric 213. The switched fabric 213 comprises a communications topology through which the CPU packages 204 and sensors 212 are coupled via a plurality of switching mechanisms (e.g., latches, switches, crossbar switches, field programmable gate arrays (FPGAs)). For example, the switched fabric 213 may implement a mesh connection connecting the CPU packages 204 and sensors 212 as endpoints, with the switching mechanisms serving as intermediary nodes of the mesh connection. The CPU packages 204 and sensors 212 may be in communication via a plurality of switched fabrics 213. For example, each of the switched fabrics 213 may include the CPU packages 204 and sensors 212, or a subset of the CPU packages 204 and sensors 212, as endpoints. Each switched fabric 213 may also comprise a respective plurality of switching components. The switching components of a given switched fabric 213 may be independent (e.g., not connected) of the switching components of other switched fabrics 213 such that only switched fabric 213 endpoints (e.g., the CPU packages 204 and sensors 212) are overlapping across the switched fabrics 213. This provides redundancy such that, should a connection between a CPU package 204 and sensor 212 fail in one switched fabric 213, the CPU package 204 and sensor 212 may remain connected via another switched fabric 213. Moreover, in the event of a failure in a CPU package 204, a processor of a CPU package 204, or a sensor, a communications path excluding the failed component and including a functional redundant component may be established.

The CPU packages 204 and sensors 212 are configured to receive power from one or more power supplies 215. The power supplies 215 may comprise an extension of a power system of the autonomous vehicle 100 or an independent power source (e.g., a battery, a capacitor). The power supplies 215 may supply power to the CPU packages 204 and sensors 212 by another switched fabric 214. The switched fabric 214 provides redundant power pathways such that, in the event of a failure in a power connection, a new power connection pathway may be established to the CPU packages 204 and sensors 212.

Stored in RAM 206 is an automation module 220. The automation module 220 may be configured to process sensor data from the sensors 212 to determine a driving decision for the autonomous vehicle. The driving decision comprises one or more operational commands for an autonomous vehicle 100 to affect the movement, direction, or other function of the autonomous vehicle 100, thereby facilitating autonomous driving or operation of the vehicle. Such operational commands may include a change in the speed of the autonomous vehicle 100, a change in steering direction, a change in gear, or other commands. For example, the automation module 220 may provide sensor data and/or processed sensor data as one or more inputs to a trained machine learning model (e.g., a trained neural network) to determine the one or more operational commands. The operational commands may then be communicated to autonomous vehicle control systems 223 via a vehicle interface 222.

In some embodiments, the automation module 220 may be configured to determine an exit path for an autonomous vehicle 100 in motion. The exit path includes one or more operational commands that, if executed, are determined and/or predicted to bring the autonomous vehicle 100 safely to a stop (e.g., without collision with an object, without violating one or more safety rules). The automation module 220 may determine both a driving decision and an exit path at a predefined interval. The automation module 220 may then send the driving decision and the exit path to the autonomous vehicle control systems 223. The autonomous vehicle control systems 223 may be configured to execute the driving decision unless an error state has been reached. If an error decision has been reached, therefore indicating a possible error in functionality of the automation computing system 116, the autonomous vehicle control systems 223 may then execute a last received exit path in order to bring the autonomous vehicle 100 safely to a stop. Thus, the autonomous vehicle control systems 223 are configured to receive both a driving decision and exit path at predefined intervals, and execute the exit path in response to an error.

The autonomous vehicle control systems 223 are configured to affect the movement and operation of the autonomous vehicle 100. For example, the autonomous vehicle control systems 223 may activate (e.g., apply one or more control signals) to actuators or other components to turn or otherwise change the direction of the autonomous vehicle 100, accelerate or decelerate the autonomous vehicle 100, change a gear of the autonomous vehicle 100, or otherwise affect the movement and operation of the autonomous vehicle 100.

Further stored in RAM 206 is a data collection module 224 configured to process and/or store sensor data received from the one or more sensors 212. For example, the data collection module 224 may store the sensor data as captured by the one or more sensors 212, or processed sensor 212 data (e.g., sensor 212 data having object recognition, compression, depth filtering, or any combination of these). Such processing may be performed by the data collection module 224 in real-time or in substantially real-time as the sensor data is captured by the one or more sensors 212. The processed sensor data may then be used by other functions or modules. For example, the automation module 220 may use processed sensor data as input to determine one or more operational commands. The data collection module 224 may store the sensor data in data storage 218.

Also stored in RAM 206 is a data processing module 226. The data processing module 226 is configured to perform one or more processes on stored sensor data (e.g., stored in data storage 218 by the data collection module 224) prior to upload to an execution environment 227. Such operations can include filtering, compression, encoding, decoding, or other operations. The data processing module 226 may then communicate the processed and stored sensor data to the execution environment 227.

Further stored in RAM 206 is a hypervisor 228. The hypervisor 228 is configured to manage the configuration and execution of one or more virtual machines 229. For example, each virtual machine 229 may emulate and/or simulate the operation of a computer. Accordingly, each virtual machine 229 may comprise a guest operating system 216 for the simulated computer. Each instance of virtual machine 229 may host the same operating system or one or more different operating systems. The hypervisor 228 may manage the creation of a virtual machine 229 including installation of the guest operating system 216. The hypervisor 228 may also manage when execution of a virtual machine 229 begins, is suspended, is resumed, or is terminated. The hypervisor 228 may also control access to computational resources (e.g., processing resources, memory resources, device resources) by each of the virtual machines.

Each of the virtual machines 229 may be configured to execute one or more of the automation modules 220, the data collection module 224, the data processing module 226, or combinations thereof. Moreover, as is set forth above, each of the virtual machines 229 may comprise its own guest operating system 216. Guest operating systems 216 useful in autonomous vehicles in accordance with some embodiments of the present disclosure include UNIX™, Linux™, Microsoft Windows™, AIX™, IBM's iOS™, and others. For example, the autonomous vehicle 100 may be configured to execute a first operating system when the autonomous vehicle is in an autonomous (or partially autonomous) driving mode and the autonomous vehicle 100 may be configured to execute a second operating system when the autonomous vehicle is not in an autonomous (or partially autonomous) driving mode. In such an example, the first operating system may be formally verified, secure, and operate in real-time such that data collected from the sensors 212 are processed within a predetermined period of time, and autonomous driving operations are performed within a predetermined period of time, such that data is processed and acted upon essentially in real-time. Continuing with this example, the second operating system may not be formally verified, may be less secure, and may not operate in real-time as the tasks that are carried out (which are described in greater detail below) by the second operating system are not as time-sensitive the tasks (e.g., carrying out self-driving operations) performed by the first operating system.

Although the example included in the preceding paragraph relates to an embodiment where the autonomous vehicle 100 may be configured to execute a first operating system when the autonomous vehicle is in an autonomous (or partially autonomous) driving mode and the autonomous vehicle 100 may be configured to execute a second operating system when the autonomous vehicle is not in an autonomous (or partially autonomous) driving mode, other embodiments are within the scope of the present disclosure. For example, in another embodiment one CPU (or other appropriate entity such as a chip, CPU core, and so on) may be executing the first operating system and a second CPU (or other appropriate entity) may be executing the second operating system, where switching between these two modalities is accomplished through fabric switching, as described in greater detail below. Likewise, in some embodiments, processing resources such as a CPU may be partitioned where a first partition supports the execution of the first operating system and a second partition supports the execution of the second operating system.

The guest operating systems 216 may correspond to a particular operating system modality. An operating system modality is a set of parameters or constraints which a given operating system satisfies, and are not satisfied by operating systems of another modality. For example, a given operating system may be considered a "real-time operating system" in that one or more processes executed by the operating system must be performed according to one or more time constraints. The time constraint may not necessarily be in real-time, but instead with the highest or one of the highest priorities so that operations indicated for a real-time modality are executed faster than operations without such a priority. For example, as the automation module 220 must make determinations as to operational commands to facilitate autonomous operation of a vehicle. Accordingly, the automation module 220 must make such determinations within one or more time constraints in order for autonomous operation to be performed in real-time. The automation module 220 may then be executed in an operating system (e.g., a guest operating system 216 of a virtual machine 229) corresponding to a "real-time operating system" modality. Conversely, the data processing module 226 may be able to perform its processing of sensor data independent of any time constraints, and may then be executed in an operating system (e.g., a guest operating system 216 of a virtual machine 229) corresponding to a "non-real-time operating system" modality.

As another example, an operating system (e.g., a guest operating system 216 of a virtual machine 229) may comprise a formally verified operating system. A formally verified operating system is an operating system for which the correctness of each function and operation has been verified with respect to a formal specification according to formal proofs. A formally verified operating system and an unverified operating system (e.g., one that has not been formally verified according to these proofs) can be said to operate in different modalities.

Figure 2:
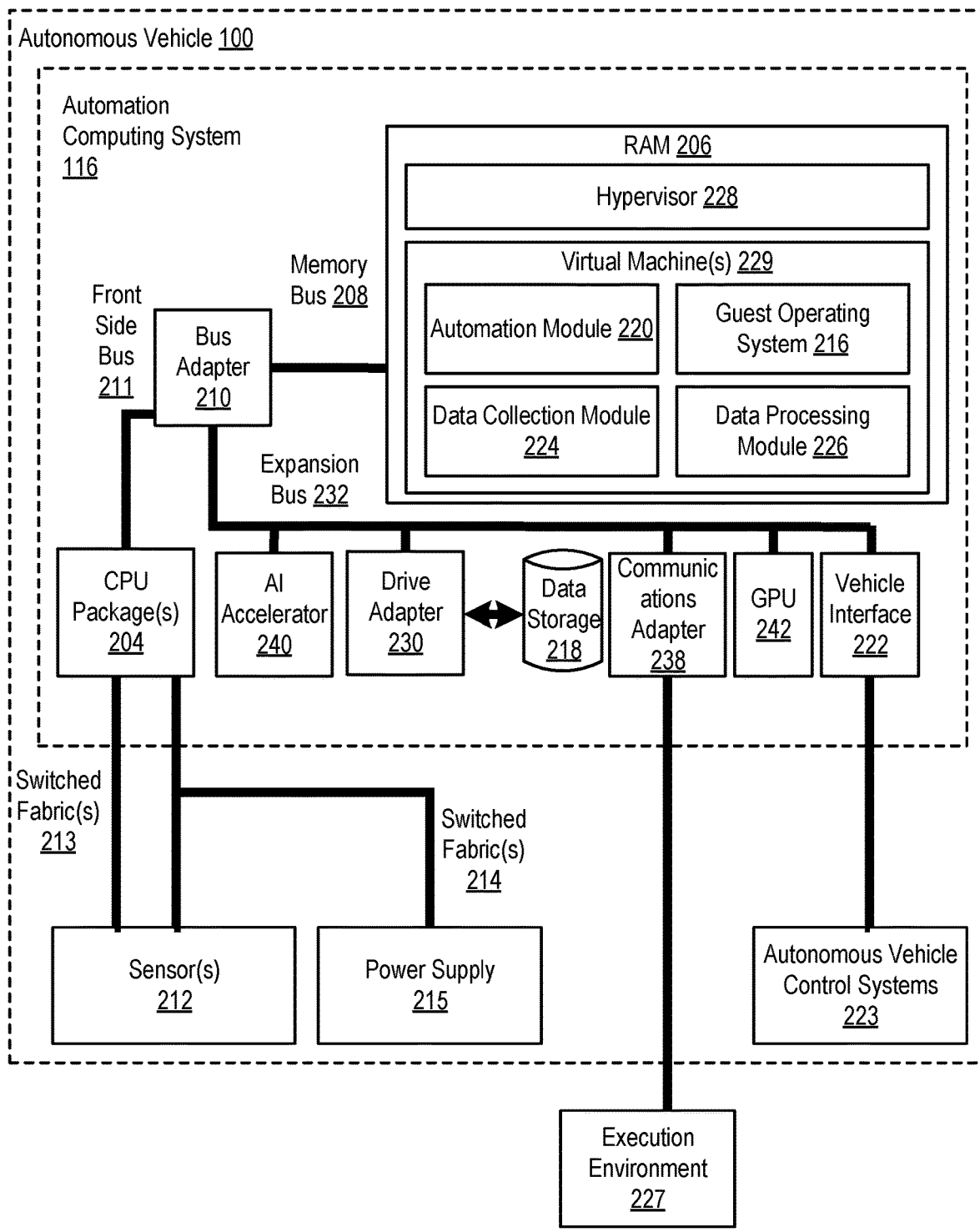
FIG. 2 is a block diagram of an autonomous computing system for autonomous vehicle model training and validation using low-discrepancy sequences according to some embodiments of the present disclosure.

The automation module 220, data collection module 224, data collection module 224, data processing module 226, hypervisor 228, and virtual machine 229 in the example of FIG. 2 are shown in RAM 206, but many components of such software typically are stored in non-volatile memory also, such as, for example, on data storage 218, such as a disk drive. Moreover, any of the automation module 220, data collection module 224, and data processing module 226 may be executed in a virtual machine 229 and facilitated by a guest operating system 216 of that virtual machine 229.

The automation computing system 116 of FIG. 2 includes disk drive adapter 230 coupled through expansion bus 232 and bus adapter 210 to CPU package(s) 204 and other components of the automation computing system 116. Disk drive adapter 230 connects non-volatile data storage to the automation computing system 116 in the form of data storage 218. Disk drive adapters 230 useful in computers configured for autonomous vehicle model training and validation using low-discrepancy sequences according to various embodiments include Integrated Drive Electronics ('IDE') adapters, Small Computer System Interface (SCSI') adapters, and others. Non-volatile computer memory also may be implemented for as an optical disk drive, electrically erasable programmable read-only memory (so-called 'EEPROM' or 'Flash' memory), RAM drives, and so on.

The exemplary automation computing system 116 of FIG. 2 includes a communications adapter 238 for data communications with other computers and for data communications with a data communications network. Such data communications may be carried out serially through RS-238 connections, through external buses such as a Universal Serial Bus ('USB'), through data communications networks such as IP data communications networks, and in other ways. Communications adapters implement the hardware level of data communications through which one computer sends data communications to another computer, directly or through a data communications network. Examples of communications adapters useful in computers configured for autonomous vehicle model training and validation using low-discrepancy sequences according to specific embodiments include modems for wired dial-up communications, Ethernet (IEEE 802.3) adapters for wired data communications, 802.11 adapters for wireless data communications, as well as mobile adapters (e.g., cellular communications adapters) for mobile data communications. For example, the automation computing system 116 may communicate with one or more remotely disposed execution environments 227 via the communications adapter 238.

The exemplary automation computing system of FIG. 2 also includes one or more Artificial Intelligence (AI) accelerators 240. The AI accelerator 240 provides hardware-based assistance and acceleration of AI-related functions, including machine learning, computer vision, etc. Accordingly, performance of any of the automation module 220, data collection module 224, data processing module 226, or other operations of the automation computing system 116 may be performed at least in part by the AI accelerators 240.

The exemplary automation computing system of FIG. 2 also includes one or more graphics processing units (GPUs) 242. The GPUs 242 are configured to provide additional processing and memory resources for processing image and/or video data, including encoding, decoding, etc. Accordingly, performance of any of the automation module 220, data collection module 224, data processing module 226, or other operations of the automation computing system 116 may be performed at least in part by the GPUs 242.

Figure 3:
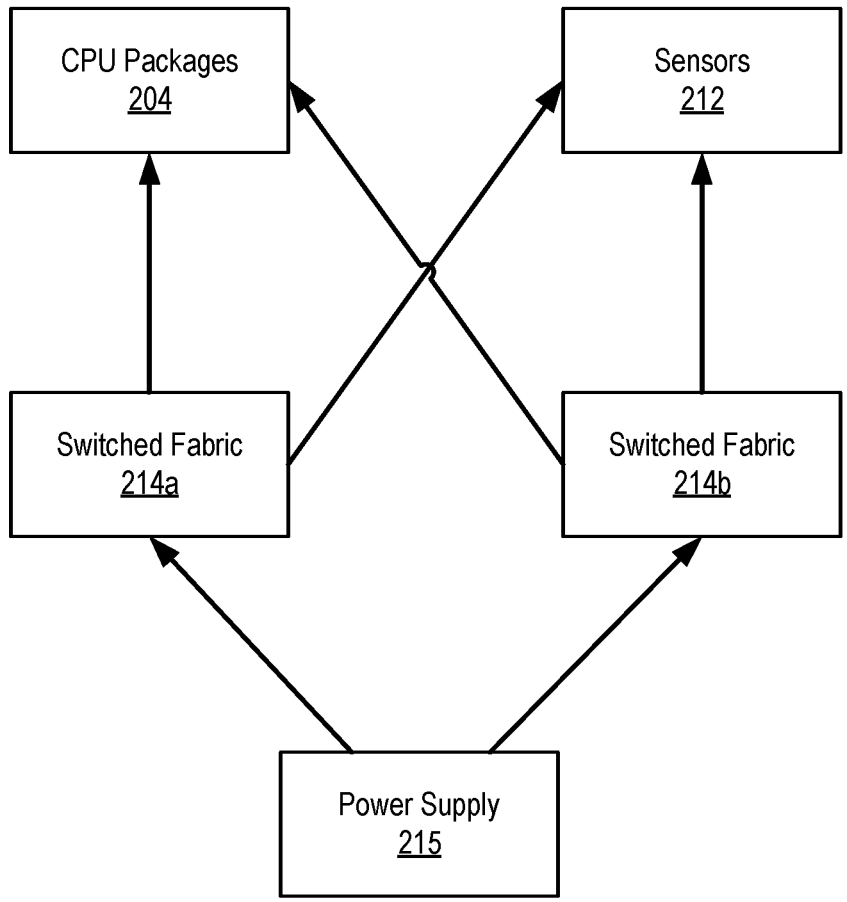
FIG. 3 is a block diagram of a redundant power fabric for autonomous vehicle model training and validation using low-discrepancy sequences according to some embodiments of the present disclosure.

FIG. 3 shows an example redundant power fabric for autonomous vehicle model training and validation using low-discrepancy sequences. The redundant power fabric provides redundant pathways for power transfer between the power supplies 215, the sensors 212, and the CPU packages 204. In this example, the power supplies 215 are coupled to the sensors 212 and CPU packages via two switched fabrics 214a and 214b. The topology shown in FIG. 3 provides redundant pathways between the power supplies 215, the sensors 212, and the CPU packages 204 such that power can be rerouted through any of multiple pathways in the event of a failure in an active connection pathway. The switched fabrics 214a and 214b may provide power to the sensors 212 using various connections, including Mobile Industry Processor Interface (MIPI), Inter-Integrated Circuit (I2C), Universal Serial Bus (USB), or another connection. The switched fabrics 214a and 214b may also provide power to the CPU packages 204 using various connections, including Peripheral Component Interconnect Express (PCIe), USB, or other connections. Although only two switched fabrics 214a and 214b are shown connecting the power supplies 215 to the sensors 212 and CPU packages 204, the approach shown by FIG. 3 can be modified to include three, four, five, or more switched fabrics 214.

Figure 4:
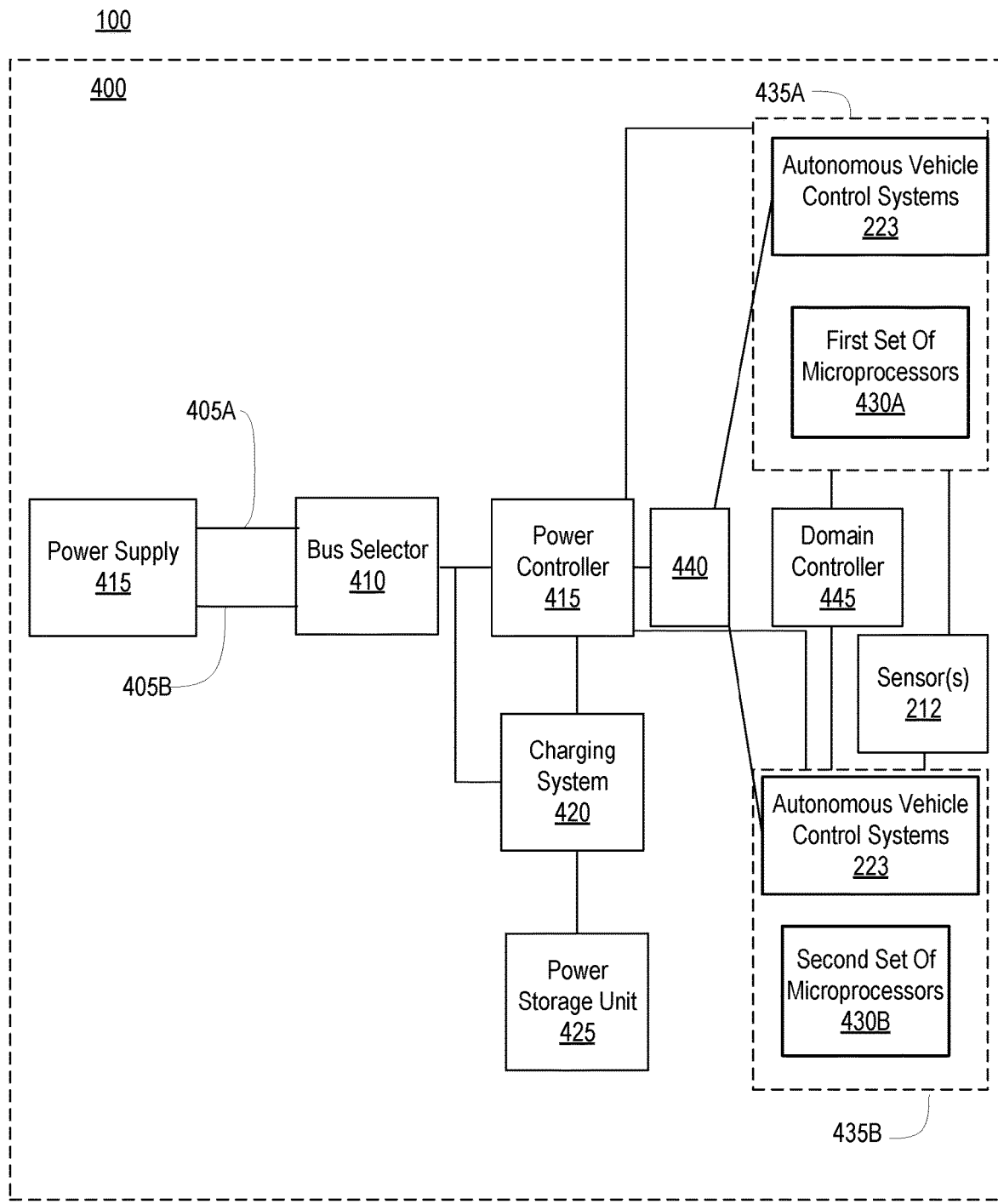
FIG. 4 is example system for redundantly supplying power to one or more microprocessors of an autonomous vehicle 100 according to some embodiments of the present disclosure.

FIG. 4 is an example system 400 for redundantly supplying power to one or more microprocessors of an autonomous vehicle 100. the system 400 includes a plurality of buses 405A, 405B (also referred to individually and collectively using reference number 405). Each bus 405 is coupled to the power supply 215 and to a bus selector 410. Further, each bus 405 of the plurality of buses 405 is independent of other buses 405 of the plurality of buses 405. While FIG. 4 shows an embodiment with two buses 405A, 405B, in other embodiments, different numbers of buses 405 are included in the system 400. For example, various embodiments include three buses 405, four buses 405, five buses 405, or any other number of buses 405.

The bus selector 410 selects one of the plurality of buses 405 as an output of the bus selector 410. The bus selector 410 is one or more integrated circuits or other logic circuits that selects one of the buses 405A, 405B as an output based on characteristics of voltage or current detected along bus 405A and bus 405B. For example, the bus selector 410 selects bus 405A as output in response to the bus selector 410 detecting a higher voltage on bus 405A than on bus 405B. Similarly, the bus selector 410 selects bus 405B as output in response to the bus selector 410 detecting a higher voltage on bus 405B than on bus 405A. In various embodiments, the bus selector 410 selects whichever bus 405 coupled to the bus selector 410 having a highest voltage as the output of the bus selector 410.

The output of the bus selector 410 is coupled to a power controller 415, which is also coupled to a power storage unit 425. In some embodiments, the output of the bus selector 410 is coupled to the power storage unit 425. The power controller 415 is a microcontroller, processor, logical circuit, field-programmable gate array (FPGA), or other structure configured to select a power output as one of the outputs of the bus selector 410 or the power storage unit 425. However, in some embodiments, such as the embodiment shown in FIG. 4, the output of the bus selector 410 is coupled to a charging system 420, with the charging system 420 coupled to the power storage unit 425. In some embodiments, the power controller 415 is coupled to the charging system 420, with the charging system 420 coupled to the power storage unit 425. However, in other embodiments, the power controller 415 is directly coupled to the power storage unit 425, and the output of the bus selector 410 is coupled to the charging system 420.

The power controller 415 selects the power output based on the output of the bus selector 410. The power output of the power controller 415 is coupled to at least one of a first power domain 435A or a second power domain 435B, with the first power domain 435A including a first set of microprocessors 430A and the second power domain 435B including a second set of microprocessors 430B. While FIG. 4 shows an example including two power domains, in other embodiments, additional power domains are coupled to the power controller 415 to increase redundancy. The power output selected by the power controller 415 is directed to at least one of the first power domain 435A or the second power domain 435B. In various embodiments, the power output is directed to a single power domain 435, with other power domains 435 not receiving power. In other embodiments, power is provided to a power domain 435A through the power output, with a portion of the power output sufficient for one or more microprocessors in the power domain 435B to operate in a standby mode directed to the power domain 435B.

In various embodiments, the power controller 415 selects the power output based on a voltage of the output of the bus selector 410. For example, the power controller 415 selects the power output as the output of the bus selector 410 in response to determining the voltage of the output of the bus selector 410 is at least a threshold voltage. In the preceding example, the power controller 415 selects the power output as an output of the power storage unit 425 in response to determining the voltage of the output of the bus selector 410 is less than the threshold voltage. For example, the threshold voltage is a voltage sufficient to operate at least one of the first power domain 435A or the second power domain 435B. In some embodiments, the threshold voltage is specified as a voltage sufficient to operate the first set of microprocessors 430A or the second set of microprocessors 430B for at least a threshold amount of time. The threshold voltage is stored in a memory of the power controller 415 in various embodiments, allowing different systems 400 to specify different threshold voltages for selecting the power output of the power controller 415.

In various embodiments, the threshold voltage stored by the power storage unit 425 is sufficient to power the first power domain 435A or the second power domain 435B for a threshold amount of time for the autonomous vehicle 100 to complete a minimal risk condition. As used herein, a "minimal risk condition" specifies one or more actions for the autonomous vehicle 100 to complete while an autonomous mode to allow a driver to resume manual control of the autonomous vehicle 100 or for the autonomous vehicle 100 to safely come to a stop while in the autonomous mode. In some embodiments, the minimal risk condition specifies the autonomous vehicle 100 moving to an emergency lane or otherwise out of a lane including moving traffic and stopped. In other embodiments, the minimal risk condition specifies the autonomous vehicle 100 travels an off ramp and comes to a stop. As another example, a minimal risk condition specifies the autonomous vehicle 100 enters a lane for traffic moving at a slower speed. In another example, a minimal risk condition specifies the autonomous vehicle 100 perform autonomous control operations for a threshold amount of time to allow a driver to resume manual control of the autonomous vehicle 100. For another example, the minimal risk condition specifies the autonomous vehicle 100 come to a stop in a lane where the autonomous vehicle 100 Is currently travelling. In other embodiments, the minimal risk condition specifies multiple actions for the autonomous vehicle to complete 100. For example, a minimal risk condition specifies the autonomous vehicle 100 complete a maneuver in progress, move to a different lane than a current lane, identify a location out of a flow of traffic (e.g., on a side of a road), come to a stop in the identified location, park, and turn on hazard lights. In different embodiments, different combinations of actions or actions are specified as the minimal risk condition; for example, different autonomous vehicles 100 store information identifying different vehicle-specific minimal risk conditions. Both the first power domain 435A and the second power domain 435B are capable of providing instructions for completing the minimal risk condition.

The charging system 420 provides power from the output of the bus selector 410 to the power storage unit 425. This causes the output of the bus selector 410 to charge the power storage unit 425, allowing the power storage unit 425 to store power from the power supply 401 received via the output of the bus selector 410. In some embodiments, the charging system 420 obtains charging information from the power storage unit 425 and adjusts charging of the power storage unit 425 accordingly. For example, the charging system 420 obtains a current voltage from the power storage unit 425 and determines whether a current voltage of the power storage unit 425 is less than a threshold voltage.

The power storage unit 425 is a device configured to store power. Examples of the power storage unit 425 include a battery or a capacitor. In various embodiments, the power storage unit 425 is configured to store a minimum voltage for operating at least one of the first set of microprocessors 430A or the second set of microprocessors 430B. For example, the power storage unit 425 is configured to store a voltage capable of operating at least one of the first set of microprocessors 430A or the second set of microprocessors 430B for at least a threshold amount of time. The power storage unit 425 receives power from the output of the bus selector 410, so the power storage unit 425 accumulates power received from output of the bus selector 410. This allows the power storage unit 425 to act as an alternative power source that is charged while at least one of the buses 405 is supplying power as the output of the bus selector 410 and is used when the output of the bus selector 410 satisfies one or more criteria (e.g., when the output of the bus selector 410 has less than a threshold voltage). In different embodiments, the power storage unit 425 has different power storage capacities or charges at different rates. While FIG. 4 shows a single power storage unit 425 for purposes of illustration, in other embodiments, the system 400 includes multiple power storage units 425 coupled to the output of the bus selector 410 and to the power controller 415.

In the embodiment shown in FIG. 4, the power output of the power controller is coupled to a control bus 440 that comprises connections between the power controller 415 and each of at least a collection of autonomous vehicle control systems 223 to route power from the power storage unit 425 to at least the collection of autonomous vehicle control systems 223. Inclusion of the control bus 440 simplifies routing of power from the power storage unit 425 to different autonomous vehicle control systems 223. In some embodiments, the threshold amount of power stored by the power storage unit 425 is sufficient to operate the collection of autonomous vehicle control systems 223 and one of the first set of microprocessors 430A or the second set of microprocessors 430B for a sufficient amount of time for the autonomous vehicle 100 to complete a minimum risk condition. The collection of autonomous vehicle control systems 223 includes an automation module 220 capable of completing a minimal risk condition and includes one or more autonomous vehicle control systems 223 capable of modifying movement of the autonomous vehicle 100. For example, the collection of systems 223 includes a braking system and a steering system. One or more lighting systems may be included in the collection of autonomous vehicle control systems 223 in various implementations. The collection of autonomous vehicle control systems 223 excludes one or more autonomous vehicle control systems, such as an entertainment system or a heating and air conditioning control system, in various embodiments.

A domain controller 445 is coupled to the first power domain 435A and to the second power domain 435B. The domain controller 445 includes switching logic that redirects power from the power output of the power controller 415 to the first power domain 435A or to the second power domain 435B based on one or more conditions. For example, the domain controller 445 routes power that the first power domain 435A receives from the power output of the power controller 415 to the second power domain 435B in response to one or more microprocessors in the first power domain 435A providing less than a threshold amount of functionality. In various embodiments, the domain controller 445 monitors the first power domain 435A and the second power domain 435B and determines whether the first power domain 435A or the second power domain 435B is capable of providing instructions for the autonomous vehicle to complete a minimal risk condition using at least the collection of the autonomous vehicle control systems 223 that control movement of the autonomous vehicle 100 while the autonomous vehicle 100 is in an autonomous mode based on instructions provided by the first set of microprocessors 430A or by the second set of microprocessors 430B. In response to determining the first power domain 435A is not capable of providing instructions to at least the collection of autonomous vehicle control systems 223 to complete the minimal risk condition, the domain controller 445 routes power from the first power domain 435A to the second power domain 435B. Similarly, in response to determining the second power domain 435B is not capable of providing instructions to at least the collection of autonomous vehicle control systems 223 to complete the minimal risk condition, the domain controller 445 routes power from the second power domain 435B to the first power domain 435A. The domain controller 445 allows the power output of the power controller 415 to be routed to a power domain 435 capable of completing a minimal risk condition, providing redundancy for the autonomous vehicle completing a minimal risk condition while in an autonomous mode. This allows the domain controller 445 to direct the power output to a power domain 435 capable of executing functionality for completing a minimal risk condition, providing additional safety for a driver of the autonomous vehicle 100.

Figure 5:
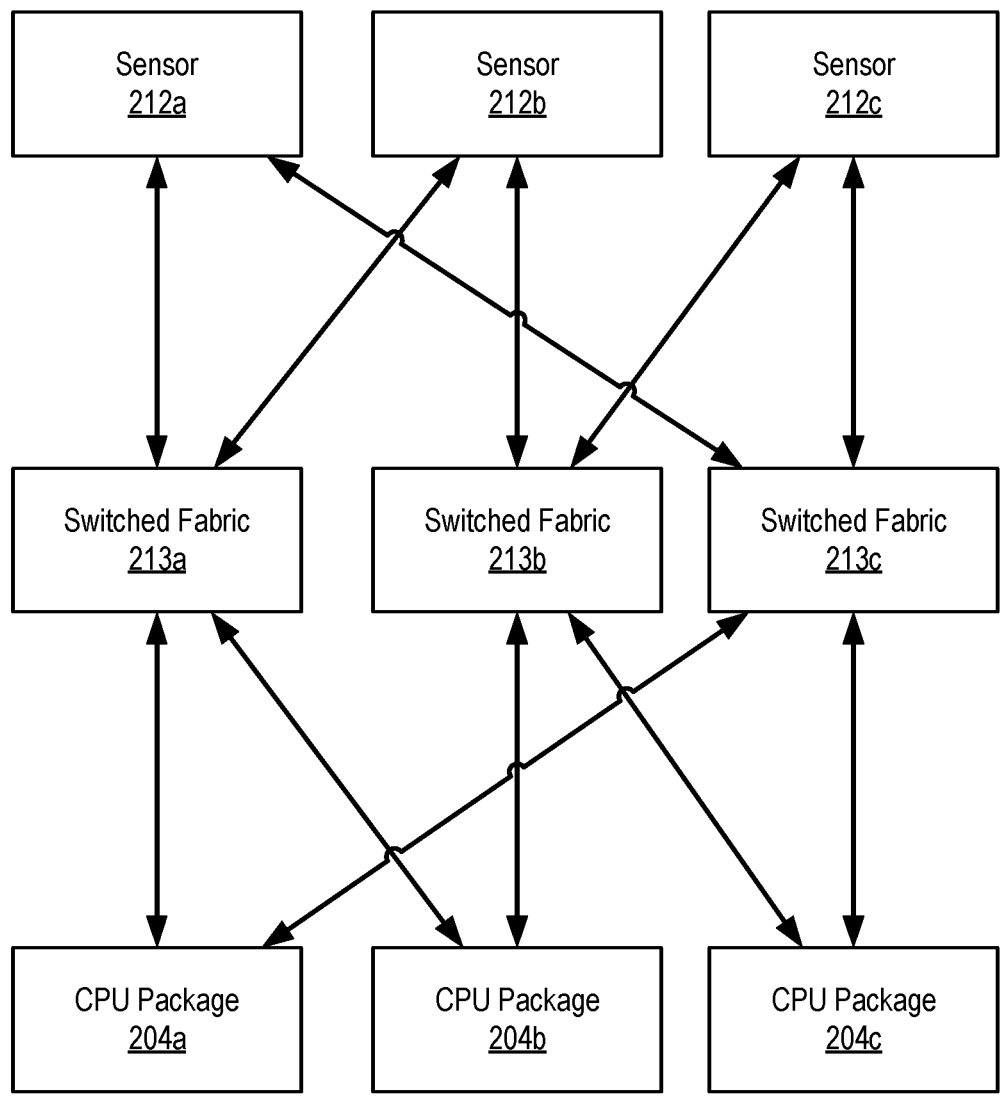
FIG. 5 is a block diagram of a redundant data fabric for autonomous vehicle model training and validation using low-discrepancy sequences according to some embodiments of the present disclosure.

FIG. 5 is an example redundant data fabric for autonomous vehicle model training and validation using low-discrepancy sequences. The redundant data fabric provides redundant data connection pathways between sensors 212 and CPU packages 204. In this example view, three CPU packages 204a, 204b, and 204c are connected to three sensors 212a, 212b, and 212c via three switched fabrics 213a, 213b, and 213c. Each CPU package 204a, 204b, and 204c is connected to a subset of the switched fabrics 213a, 213b, and 213c. For example, CPU package 204a is connected to switched fabrics 213a and 213c, CPU package 204b is connected to switched fabrics 213a and 213b, and CPU package 204c is connected to switched fabrics 213b and 213c. Each switched fabric 213a, 213b, and 213c is connected to a subset of the sensors 212a, 212b, and 212c. For example, switched fabric 213a is connected to sensors 212a and 212b, switched fabric 213b is connected to sensor 212b and 212c, and switched fabric 213c is connected to sensors 212a and 212c. Under this topology, each CPU package 204a, 204b, and 204c has an available connection path to any sensor 212a, 212b, and 212c. It is understood that the topology of FIG. 5 is exemplary, and that CPU packages, switched fabrics, sensors, or connections between components may be added or removed while maintaining redundancy.

Figure 6:
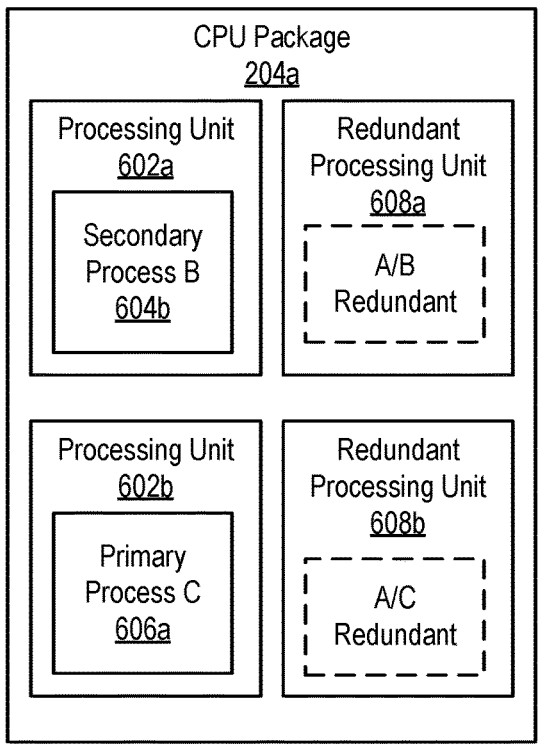
FIG. 6 is an example view of process allocation across CPU packages for autonomous vehicle model training and validation using low-discrepancy sequences according to some embodiments of the present disclosure.
Figure 6:
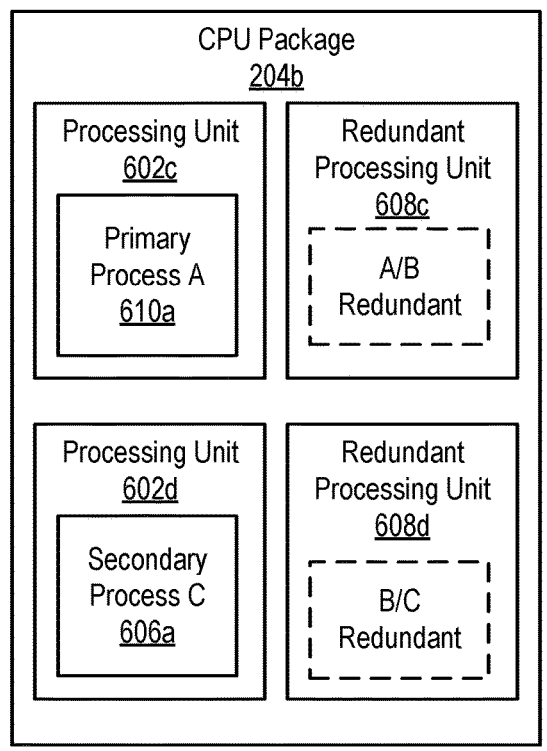
Figure 6:
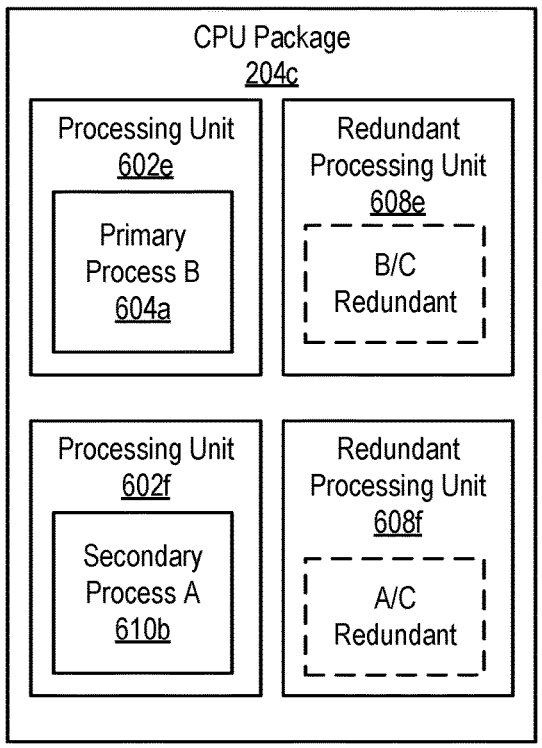

FIG. 6 is an example view of process allocation across CPU packages for autonomous vehicle model training and validation using low-discrepancy sequences. Shown are three CPU packages 204a, 204b, and 204c. Each CPU package 204a includes a processing unit that has been allocated (e.g., by a hypervisor 228 or other process or service) primary execution of a process and another processing unit that has been allocated secondary execution of a process. As set forth herein, primary execution of a process describes an executing instance of a process whose output will be provided to another process or service. Secondary execution of the process describes executing an instance of the process in parallel to the primary execution, but the output may not be output to the other process or service. For example, in CPU package 204a, processing unit 602a has been allocated secondary execution of "process B," denoted as secondary process B 604b, while processing unit 602b has been allocated primary execution of "process C," denoted as primary process C 606a.

CPU package 204a also comprises two redundant processing units that are not actively executing a process A, B, or C, but are instead reserved in case of failure of an active processing unit. Redundant processing unit 608a has been reserved as "AB redundant," indicating that reserved processing unit 608a may be allocated primary or secondary execution of processes A or B in the event of a failure of a processing unit allocated the primary or secondary execution of these processes. Redundant processing unit 608b has been reserved as "A/C redundant," indicating that reserved processing unit 608b may be allocated primary or secondary execution of processes A or C in the event of a failure of a processing unit allocated the primary or secondary execution of these processes.

CPU package 204b includes processing unit 602c, which has been allocated primary execution of "process A," denoted as primary process A 610a, and processing unit 602d, which has been allocated secondary execution of "process C," denoted as secondary process C 606a. CPU package 204b also includes redundant processing unit 608c, reserved as "AB redundant," and redundant processing unit 608d, reserved as "B/C redundant." CPU package 204c includes processing unit 602e, which has been allocated primary execution of "process B," denoted as primary process B 604a, and processing unit 602f, which has been allocated secondary execution of "process A," denoted as secondary process A 610b. CPU package 204c also includes redundant processing unit 608e, reserved as "B/C redundant," and redundant processing unit 608f, reserved as "A/C redundant."

As set forth in the example view of FIG. 6, primary and secondary instances processes A, B, and C are each executed in an allocated processing unit. Thus, if a processing unit performing primary execution of a given process fails, the processing unit performing secondary execution may instead provide output of the given process to a receiving process or service. Moreover, the primary and secondary execution of a given process are executed on different CPU packages. Thus, if an entire processing unit fails, execution of each of the processes can continue using one or more processing units handling secondary execution. The redundant processing units 608a—f allow for allocation of primary or secondary execution of a process in the event of processing unit failure. This further prevents errors caused by processing unit failure as parallel primary and secondary execution of a process may be restored. The number of CPU packages, processing units, redundant processing units, and processes may be modified according to performance requirements while maintaining redundancy.

Figure 7:
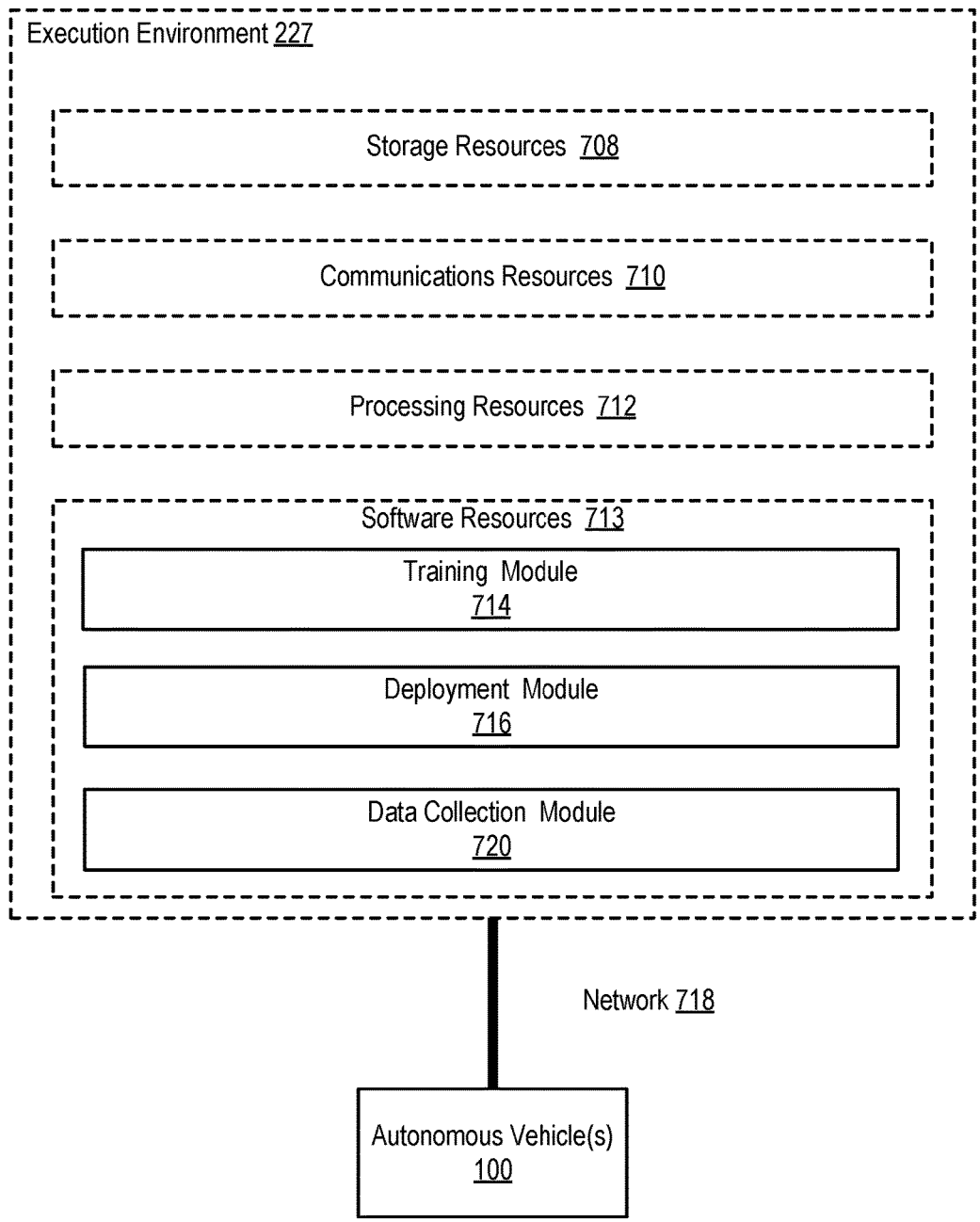
FIG. 7 is an example view of an execution environment for autonomous vehicle model training and validation using low-discrepancy sequences according to some embodiments of the present disclosure.

For further explanation, FIG. 7 sets forth a diagram of an execution environment 227 in accordance with some embodiments of the present disclosure. The execution environment 227 depicted in FIG. 7 may be embodied in a variety of different ways. The execution environment 227 may be provided, for example, by one or more physical or virtual machine components consisting of bare-metal applications, operating systems such as Android, Linux, Real-time Operating systems (RTOS), Automotive RTOS, such as AutoSAR, and others, including combinations thereof. The execution environment 227 may also be provided by cloud computing providers such as Amazon AWS™, Microsoft Azure™, Google Cloud™, and others, including combinations thereof. Alternatively, the execution environment 227 may be embodied as a collection of devices (e.g., servers, storage devices, networking devices) and software resources that are included in a computer or distributed computer or private data center. The execution environment 227 may be constructed in a variety of other ways and may even include resources within one or more autonomous vehicles or resources that communicate with one or more autonomous vehicles.

The execution environment 227 depicted in FIG. 7 may include storage resources 708, which may be embodied in many forms. For example, the storage resources 708 may include flash memory, hard disk drives, nano-RAM, 3D crosspoint non-volatile memory, MRAM, non-volatile phase-change memory (PCM), storage class memory (SCM), or many others, including combinations of the storage technologies described above. Other forms of computer memories and storage devices may be utilized as part of the execution environment 227, including DRAM, SRAM, EEPROM, universal memory, and many others. The storage resources 708 may also be embodied, in embodiments where the execution environment 227 includes resources offered by a cloud provider, as cloud storage resources such as Amazon Elastic Block Storage (EBS) block storage, Amazon S3 object storage, Amazon Elastic File System (EFS) file storage, Azure Blob Storage, and many others. The example execution environment 227 depicted in FIG. 7 may implement a variety of storage architectures, such as block storage where data is stored in blocks, and each block essentially acts as an individual hard drive, object storage where data is managed as objects, or file storage in which data is stored in a hierarchical structure. Such data may be saved in files and folders, and presented to both the system storing it and the system retrieving it in the same format.

The execution environment 227 depicted in FIG. 7 also includes communications resources 710 that may be useful in facilitating data communications between components within the execution environment 227, as well as data communications between the execution environment 227 and computing devices that are outside of the execution environment 227. Such communications resources may be embodied, for example, as one or more routers, network switches, communications adapters, and many others, including combinations of such devices. The communications resources 710 may be configured to utilize a variety of different protocols and data communication fabrics to facilitate data communications. For example, the communications resources 710 may utilize Internet Protocol ('IP') based technologies, fibre channel (FC) technologies, FC over ethernet (FCoE) technologies, InfiniBand (TB) technologies, NVM Express (NVMe) technologies and NVMe over fabrics (NVMeoF) technologies, and many others. The communications resources 710 may also be embodied, in embodiments where the execution environment 227 includes resources offered by a cloud provider, as networking tools and resources that enable secure connections to the cloud as well as tools and resources (e.g., network interfaces, routing tables, gateways) to configure networking resources in a virtual private cloud. Such communications resources may be useful in facilitating data communications between components within the execution environment 227, as well as data communications between the execution environment 227 and computing devices that are outside of the execution environment 227 (e.g., computing devices that are included within an autonomous vehicle).

The execution environment 227 depicted in FIG. 7 also includes processing resources 712 that may be useful in useful in executing computer program instructions and performing other computational tasks within the execution environment 227. The processing resources 712 may include one or more application-specific integrated circuits (ASICs) that are customized for some particular purpose, one or more central processing units (CPUs), one or more digital signal processors (DSPs), one or more field-programmable gate arrays (FPGAs), one or more systems on a chip (SoCs), or other form of processing resources 712. The processing resources 712 may also be embodied, in embodiments where the execution environment 227 includes resources offered by a cloud provider, as cloud computing resources such as one or more Amazon Elastic Compute Cloud (EC2) instances, event-driven compute resources such as AWS Lambdas, Azure Virtual Machines, or many others.

The execution environment 227 depicted in FIG. 7 also includes software resources 713 that, when executed by processing resources 712 within the execution environment 227, may perform various tasks. The software resources 713 may include, for example, one or more modules of computer program instructions that when executed by processing resources 712 within the execution environment 227 are useful in training neural networks configured to determine control autonomous vehicle control operations. For example, a training module 714 may train a neural network using training data including sensor 212 data and control operations recorded or captured contemporaneous to the training data. In other words, the neural network may be trained to encode a relationship between an environment relative to an autonomous vehicle 100 as indicated in sensor 212 data and the corresponding control operations effected by a user or operation of the autonomous vehicle. The training module 714 may provide a corpus of training data, or a selected subset of training data, to train the neural network. For example, the training module 714 may select particular subsets of training data associated with particular driving conditions, environment states, etc. to train the neural network.

The software resources 713 may include, for example, one or more modules of computer program instructions that when executed by processing resources 712 within the execution environment 227 are useful in deploying software resources or other data to autonomous vehicles 100 via a network 718. For example, a deployment module 716 may provide software updates, neural network updates, or other data to autonomous vehicles 100 to facilitate autonomous vehicle control operations.

The software resources 713 may include, for example, one or more modules of computer program instructions that when executed by processing resources 712 within the execution environment 227 are useful in collecting data from autonomous vehicles 100 via a network 718. For example, a data collection module 720 may receive, from autonomous vehicles 100, collected sensor 212, associated control operations, software performance logs, or other data. Such data may facilitate training of neural networks via the training module 714 or stored using storage resources 708.

Figure 8:
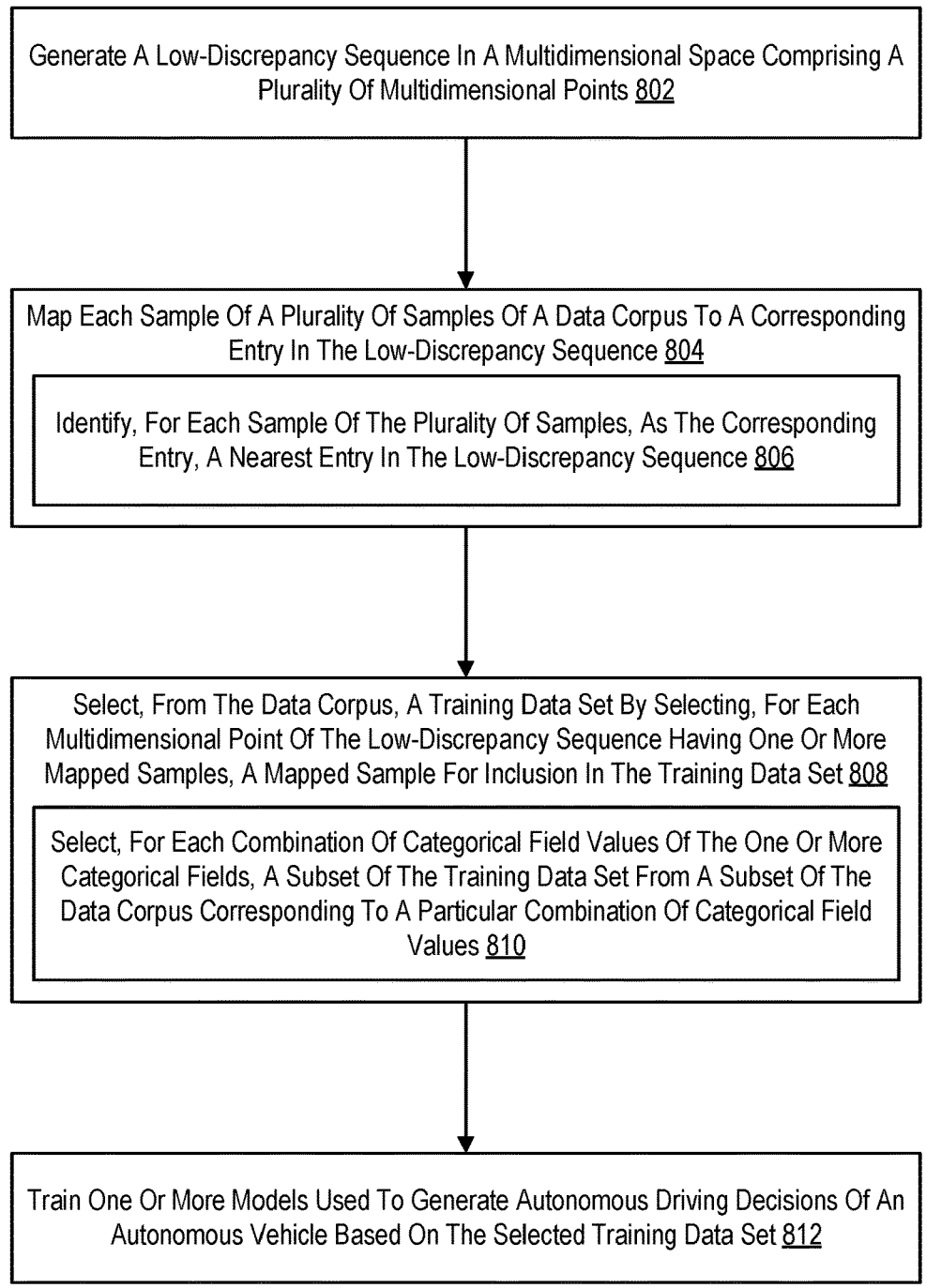
FIG. 8 is a flow chart of an example method for autonomous vehicle model training using low-discrepancy sequences according to some embodiments of the present disclosure.

For further explanation, FIG. 8 sets forth a flow chart illustrating an exemplary method for autonomous vehicle model training using low-discrepancy sequences according to some embodiments of the present disclosure. The method of FIG. 8 may be performed, for example, by an execution environment such as the execution environment of FIG. 7, or another system of computing devices or compute resources as can be appreciated. The method of FIG. 8 includes generating 802 a low-discrepancy sequence in a multidimensional space comprising a plurality of multidimensional points. The low-discrepancy sequence may include a low-discrepancy sequence or a quasi-random low-discrepancy sequence such that the resulting sequence is evenly distributed in the multidimensional space. For example, in some embodiments, the low-discrepancy sequence may include a Sobol sequence that will be evenly distributed in the multidimensional space. In some embodiments, other low-discrepancy sequences may be used, such as a Monte Carlo sequence or quasi-Monte Carlo sequence.

In some embodiments, the dimensionality of the low-discrepancy sequence (e.g., the number of dimensions in the multidimensional space) may be based on the fields of a particular data corpus. As will be described in further detail below, the low-discrepancy sequence may be used to select a training data set from a data corpus. The data corpus may include multiple samples each having a number of fields with a corresponding stored value. In some embodiments, the samples may include one or more continuous fields, with each sample having a corresponding continuous value for each continuous field. A continuous value is a continuous numerical value. For example, in some embodiments, a particular continuous field may be constrained by some defined range. The continuous values for the particular continuous field may include any number that falls within the predefined range. As another example, in some embodiments, a particular continuous field may not be bound by a range. In some embodiments, the samples may include one or more categorical fields with corresponding categorical values. A categorical value for a particular categorical field is selected from an enumeration of multiple possible categorical values (e.g., categories, labels, and the like) for that particular categorical field.

Accordingly, in some embodiments, the dimensionality of the low-discrepancy sequence may correspond to a number of continuous fields for the samples of the data corpus. For example, where the data corpus includes samples having N continuous fields, the low-discrepancy sequence may be generated 802 in a multidimensional space having N dimensions. Thus, each dimension in the low-discrepancy sequence may correspond to a particular continuous field in the data corpus. In some embodiments, the dimensionality of the low-discrepancy sequence may correspond to a number of continuous fields in a subset of the continuous fields. For example, in some embodiments, one or more of the continuous fields may be identified as being excluded or otherwise irrelevant when selecting samples from the data corpus, such as when samples are selected based on some schema selecting a subset of fields. Continuing with this example, assume that the low-discrepancy sequence will be used for selecting a training data set from the data corpus. Further assume that certain continuous fields are either identified as being irrelevant to the training data set, or that certain continuous fields of the data corpus will be excluded from the selected training data set. Such continuous fields are hereinafter referred to as "excluded continuous fields."

As an example, assume that the data corpus includes samples storing sensor data of a sensor-equipped vehicle, with the samples including one or more continuous fields indicating a geographic location at which the sensor data was generated or gathered. As the geographic location of where sensor data was gathered may not be relevant or useful in training a model (e.g., a model for autonomous driving), the continuous fields indicating the geographic location may be designated as excluded continuous fields. As another example, assume that a request for selecting training data from the data corpus indicates a particular subset of categorical fields to be included in the selected training data. Continuous fields not particularly indicated in the request may then be treated as excluded continuous fields. Thus, each dimension in the low-discrepancy sequence may correspond to a particular continuous field not otherwise excluded or omitted. Accordingly, in some embodiments, the low-discrepancy sequence may be generated 802 as having a number of dimensions equal to the number of continuous fields of the data corpus less the number of excluded continuous fields. For example, assuming a data corpus of N continuous fields and M excluded continuous fields, the low-discrepancy sequence may be generated 802 as having (N-M) dimensions.

Where the data corpus includes one or more categorical fields, the low-discrepancy sequence may be generated 802 independent of the number of categorical fields. In other words, the number of categorical fields in the data corpus may not affect the dimensionality of the low-discrepancy sequence. In other embodiments, the low-discrepancy sequence may be generated as having a number of dimensions based on the number of categorical fields. For example, the low-discrepancy sequence may be generated as having a number of dimensions equal to the total number of categorical and continuous fields or as having a number of dimensions equal to the total number of categorical and continuous fields less any excluded continuous and/or categorical fields. Such excluded categorical fields may be determined or identified according to similar approaches as are set forth above with respect to excluded continuous fields. In some embodiments, the dimensionality of the low-discrepancy sequence may be determined or calculated according to other approaches, with such approaches being based on or independent of the number of categorical fields and/or continuous fields in the data corpus.

The low-discrepancy sequence includes multiple multi-dimensional points (e.g., entries). In some embodiments, the number of entries for the low-discrepancy sequence may include a predefined number. In some embodiments, the number of entries for the low-discrepancy sequence may include a randomly generated or dynamically calculated number. In some embodiments, the number of entries for the low-discrepancy sequence may correspond to or be based on an input number. For example, in some embodiments, as will be described in further detail below, the number of entries for the low-discrepancy sequence may be based on a request to select a number of samples from the data corpus (e.g., as a training data set). The number of entries in the low-discrepancy sequence may also be calculated according to other approaches.

The method of FIG. 8 also includes mapping 804 each sample of a plurality of samples of a data corpus to a corresponding entry in the low-discrepancy sequence. As referred to herein, the plurality of samples of the data corpus may include the entirety of the data corpus or a particular (e.g., designated or dynamically determined) subset of the data corpus. In some embodiments, the data corpus may include data generated by a sensor-equipped vehicle, such as an autonomous vehicle or other sensor-equipped vehicle. For example, the samples in the data corpus may include sensor data (e.g., particular measurements or other generated data) generated by various sensors of the vehicle, including accelerometers, gyroscopes, GPS radios, cameras, radar, LiDAR, sensors monitoring the operational state of various components of the vehicle, and the like.

In some embodiments, the samples in the data corpus may include one or more environmental descriptors describing an environment relative to a vehicle (e.g., an ego sensor-equipped vehicle) at a particular time. For example, the one or more environmental descriptors may include indications of one or more distances from the vehicle to one or more other objects, including distances to other vehicles, lane markers or other road features, and the like. As another example, the one or more environmental descriptors may include an indication of a number of other objects detected, including a number of other vehicles detected. As a further example, the one or more environmental descriptors may include descriptions or measurements of temperature, light, weather, and the like. As yet another example, the one or more environmental descriptors may indicate a time at which the sensor data was generated. Each of the environmental descriptors may be expressed as a categorical value or a continuous value, and therefore correspond to a categorical field or continuous field, depending on the particular environmental descriptor and/or particular design considerations.

In some embodiments, the samples in the data corpus may include one or more state descriptors describing a state of the vehicle at a particular time. For example, the one or more state descriptors may include a velocity of the vehicle. As another example, the one or more state descriptors may include an amount of acceleration and/or braking being applied. As a further example, the one or more state descriptors may describe the heading of the vehicle, including the heading or angle of the vehicle relative to the road. As an additional example, the one or more state descriptors may include a degree of rotation of one or more wheels of the vehicle. As yet another example, the one or more state descriptors may indicate an operational state of one or more components or systems of the vehicle (e.g., whether the components are currently activated or deactivated, whether the components are functioning properly, detected errors, descriptive attributes), such as lights, tires, brakes, and the like.

In some embodiments, the samples in the data corpus may include one or more fields other than the categorical or continuous fields described above. For example, the samples in the data corpus may include one or more images, sound or video samples, or other data encoding measurements or samples generated by particular sensors (e.g., data encoding radar or LiDAR measurements). In some embodiments, the samples in the data corpus may include references (e.g., as file names or storage locations) to such data. Accordingly, though such fields may be included in the data corpus, the low-discrepancy sequence may be generated independent of such fields while a selected data set (e.g., selected training data set) may include the data corresponding to such fields.

Mapping 804 each sample of the plurality of samples of the data corpus to a corresponding entry in the low-discrepancy sequence results in each sample of the plurality of samples being associated (e.g., mapped) with some entry in the low-discrepancy sequence. Each entry in the low-discrepancy sequence is then mapped to zero or more samples in the plurality of samples of the data corpus. In some embodiments, mapping 804 each sample of the plurality of samples of the data corpus to a corresponding entry in the low-discrepancy sequence includes identifying 806, for each sample of the plurality of samples, as the corresponding entry, a nearest entry in the low-discrepancy sequence. For example, in some embodiments, a distance between a particular entry in the low-discrepancy sequence and a particular sample may be calculated or expressed as a Euclidian distance in the multidimensional space. As is set forth above, each dimension of the multidimensional space, and therefore the low-discrepancy sequence, may correspond to a particular continuous field of the data corpus. Accordingly, each sample in the plurality of samples may also be expressed as a point in the multidimensional space based on the values of these continuous fields. The distance between a particular entry in the low-discrepancy sequence and a particular sample may then be calculated as the distance between their respective points in multidimensional space (e.g., using Euclidian distance or some other distance function).

In some embodiments, one or more continuous fields of the data corpus may be encoded as values that are not normalized or scaled relative to the low-discrepancy sequence. In other words, the data corpus may occupy areas of the multidimensional space outside of the constraints of the low-disparity sequence. For example, assume that the low-discrepancy sequence includes a Sobol sequence. In a Sobol sequence, the value for each dimension of a multidimensional point is a value from zero to one. In other words, each multidimensional point of N dimensions includes N values from zero to one. Further assume that, for a given continuous field, the range of values for that continuous field falls within a different range. For example, for a continuous field for vehicle velocity, the values in the data corpus may range from zero to one-hundred miles-per-hour (mph). Accordingly, values for the velocity continuous field should be scaled such that they fall within the zero-to-one range of the corresponding dimension in the Sobol sequence. Continuing with this example, a velocity of twenty-five mph may be scaled to 0.25, while a velocity of seventy mph may be scaled to 0.75. As another example, assume a continuous field for an offset of a vehicle relative to the center of the lane. Further assume that this continuous field has a range of values of −1.8 (e.g., offset 1.8 meters to the left) to 1.8 meters (offset 1.8 meters to the right), with a value of zero meaning the vehicle is perfectly centered in the lane. Values for this continuous field may then be scaled to the zero-to-one range. For example, an offset of −1.8 meters would scale to zero, an offset of 1.8 meters would scale to 1.0, an offset of zero would scale to 0.5, and the like.

In some embodiments, values for each continuous field may be scaled to a range for dimensional values in the low-discrepancy sequence. Thus, the continuous fields of the data corpus are scaled to the space of the low-discrepancy sequence. In some embodiments, scaling the continuous fields may be performed as part of a background process or another process independent of requests to select a data set from the data corpus as mapped to the low-discrepancy sequence. For example, in some embodiments, as samples are stored in the data corpus, a process may scale the continuous field values such that data sets may be later mapped to some low-discrepancy sequence, allowing a request for a data set to be serviced without requiring scaling of each continuous value in the entire data corpus. In some embodiments, the continuous values for the data corpus may be scaled in response to requests to select a data set from the data corpus as mapped to the low-discrepancy sequence. Accordingly, in some embodiments, a temporary instance of the data corpus having scaled continuous values may be generated and mapped to the low-discrepancy sequence. Thus, as is described below, a data set may be selected as including samples from this temporary, scaled instance of the data corpus. The scaled continuous values in the selected data set may then have their scaling reversed so as to restore them to their value prior to scaling. As another example, samples in the scaled, temporary instance of the data corpus may be selected based on the mapping to the low-discrepancy sequence, with their corresponding, unscaled samples in the data corpus added to the selected data set.

The method of FIG. 8 also includes selecting 808, from the data corpus, a training data set by selecting, for each multidimensional point of the low-discrepancy sequence having one or more mapped samples, a mapped sample for inclusion in the training data set. For example, where a given multidimensional point has a single mapped sample, the single mapped sample may be included in the training data set. As another example, where a given multidimensional point has multiple mapped samples that may be selected, one of the multiple mapped samples may be selected for inclusion in the training data set randomly, based on one or more rules, or by another approach.

In some embodiments, the size of the training data set (e.g., a number of included samples or entries) to be selected may affect a number of entries in the low-discrepancy sequence. For example, where a training data set of N samples is to be selected, the low-discrepancy sequence may be generated to have N entries, with each entry in the low-discrepancy sequence having a corresponding mapped entry included in the training data set. Such an approach may be used, for example, where the data corpus has no categorical fields or the training data set is selected as having no categorical fields (e.g., based on a schema lacking categorical fields).

Where the training data set, and by extension the data corpus, includes one or more categorical fields, selecting 808 the training data set may include selecting 810, for each combination of categorical field values of the one or more categorical fields, a subset of the training data set from a subset of the data corpus corresponding to a particular combination of categorical field values. In other words, for each enumerated combination of values for the one or more categorical fields, a corresponding subset of the training data set is selected from a subset of the data corpus whose entries match the enumerated combination. In some embodiments, the subset of the training data set for a particular combination of categorical field values is selected by selecting, for each entry in the low-discrepancy sequence, a mapped entry in the data corpus having categorical field values equal to the particular combination of categorical field values.

Consider an example where a training data set is to be selected from a data corpus having two categorical fields each having two possible values. In this example, assume that a first categorical field has possible values of A and B while a second categorical field has possible values of C and D. The resulting combinations of categorical field values are pairs A/C, A/D, B/C, and B/D. Here, the training data set is selected by selecting a first subset of the training data set from data corpus entries having categorical field values of A/C. A second subset of the training data set is selected from data corpus entries having categorical field values of A/D. A third subset of the training data set is selected from data corpus entries having categorical field values of B/C. A fourth subset of the training data set is selected from data corpus entries having categorical field values of B/D.

In some embodiments, the size of the training data set and the number of combinations of categorical field values may affect the number of entries in the low-discrepancy sequence. For example, in some embodiments, the size of the training data set may correspond to the number of entries in the low-discrepancy sequence multiplied by the number of combinations of categorical field values. Continuing with the example above, two categorical fields each having two possible values results in four combinations of categorical field values. Assuming a low-discrepancy sequence of N entries, the training data set may be selected as having 4*N samples. In other words, in order to select a training data set having M samples and assuming four combinations of categorical field values, a low-discrepancy sequence of M/4 entries may be generated.

In some embodiments, an entry in the low-discrepancy sequence may not have a particular mapped sample for inclusion in the training data set. For example, a particular entry in the low-discrepancy sequence may not have any mapped samples or may not have a mapped sample in a particular subspace (e.g., a subspace defined by a particular combination of categorical field values as described above). In some embodiments, where a particular entry does not have the particular mapped sample, no sample for that particular entry may be added to the training data set. Thus, when selecting a training data set of a particular size, the resulting training data set may have fewer samples than the particular size. In other embodiments, as will be described in further detail below, a synthetic training data entry may be generated and included in the training data set.

The method of FIG. 8 also includes training 812 one or more models used to generate autonomous driving decisions of an autonomous vehicle based on the selected training data set. In other words, the selected training data set is used as training data for the one or more models. As an example, the one or more models may include one or more models that themselves provide, as output, an autonomous driving decision. As another example, the one or more models may include one or more models that may be used in combination with other models to generate autonomous driving decisions (e.g., models for detecting or identifying objects, estimating distances to objects, estimating the velocity of objects, and the like).

By selecting a training data set using a mapping to an evenly distributed low-discrepancy sequence, the resulting training data set is evenly distributed in its particular domain. By selecting multiple subsets of the training data set for each combination of categorical field values, each subset of the training data set is itself evenly distributed in their respective multidimensional subspaces. This results in a higher degree of coverage for the training data, ensuring that the models are trained across an even distribution of scenarios. This is in contrast to other approaches for selecting a training data set (e.g., randomly or using some other distribution) as variations in the density of the data corpus samples may be reflected in the training data set. This may result in the model being inadequately trained in scenarios where the density of corresponding data corpus samples is lower. For example, a model for autonomous driving may be inadequately trained for particular driving conditions. When deployed in an autonomous vehicle, such a model may generate incorrect determinations or driving decisions when experiencing the particular driving conditions for which it was inadequately trained, which may result in undesirable or unsafe action by the autonomous vehicle. Thus, the approaches set forth above provide for an improvement in the functioning of autonomous vehicles and in training autonomous driving models.

Although the approaches set forth herein are described with respect to training models for autonomous driving using vehicle-specific training data, such approaches are applicable to other models and training data. Accordingly, any data corpus may be mapped to a low-discrepancy sequence as described above such that a training data set may be selected using the samples mapped to the entries in the low-discrepancy sequence.

Figure 9:
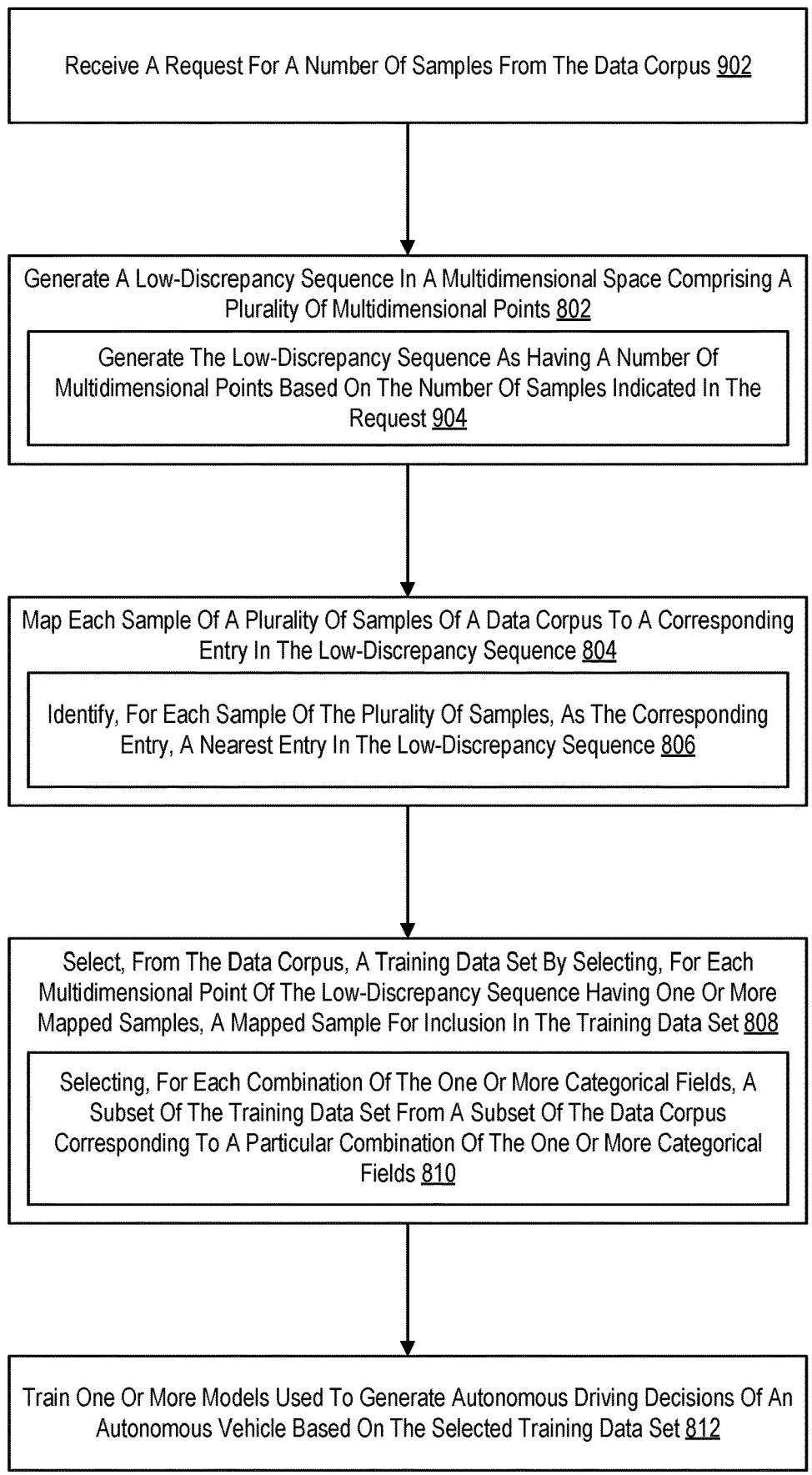
FIG. 9 is a flow chart of another example method for autonomous vehicle model training using low-discrepancy sequences according to some embodiments of the present disclosure.

For further explanation, FIG. 9 sets forth a flowchart of another example method of autonomous vehicle model training using low-discrepancy sequences according to some embodiments of the present disclosure. The method of FIG. 9 is similar to FIG. 8 in that the method of FIG. 9 also includes: generating 802 a low-discrepancy sequence in a multidimensional space comprising a plurality of multidimensional points; mapping 804 each sample of a plurality of samples of a data corpus to a corresponding entry in the low-discrepancy sequence, including identifying 806, for each sample of the plurality of samples, as the corresponding entry, a nearest entry in the low-discrepancy sequence; selecting 808, from the data corpus, a training data set by selecting, for each multidimensional point of the low-discrepancy sequence having one or more mapped samples, a mapped sample for inclusion in the training data set, including selecting 810, for each combination of categorical field values of the one or more categorical fields, a subset of the training data set from a subset of the data corpus corresponding to a particular combination of categorical field values; and training 812 one or more models used to generate autonomous driving decisions of an autonomous vehicle based on the selected training data set.

The method of FIG. 9 differs from FIG. 8 in that the method of FIG. 9 also includes receiving 902 a request for a number of samples from the data corpus. In some embodiments, the request may indicate a particular schema for samples selected from the data corpus. For example, in some embodiments, the request may indicate particular fields of the data corpus to be included in or excluded from the selected training data. The method of FIG. 9 further differs from FIG. 8 in that generating 802 a low-discrepancy sequence in a multidimensional space comprising a plurality of multidimensional points includes generating 904 the low-discrepancy sequence as having a number of multidimensional points based on the number of samples indicated in the request.

In some embodiments, generating 904 the low-discrepancy sequence may include generating the low-discrepancy sequence as having a number of multidimensional points equal to the number of samples indicated in the request. In other words, where a request for N samples is received 902, a low-discrepancy sequence having N multidimensional points (e.g., entries) may be generated 904. For example, assume that a request for a training data set of N samples is received 902 and that the training data set is to be selected such that it will not include any categorical fields (e.g., either by virtue of the data corpus lacking categorical fields or the training data schema excluding any categorical fields of the data corpus). In such an embodiment, a low-discrepancy sequence of N multidimensional points is generated such that a single mapped data corpus sample for each multidimensional point may be added to the training data set, resulting in a training data set of N samples.

In some embodiments, generating 904 the low-discrepancy sequence may include generating the low-discrepancy sequence as having a number of multidimensional points based on the number of samples indicated in the request and a number of combinations of categorical field values (e.g., of the data corpus, of the selected training data set). In some embodiments, the low-discrepancy sequence may be generated 904 by dividing the number of samples indicated in the request by the number of combinations of categorical field values. In other words, assuming a request for N samples and M different combinations of categorical field values, the low-discrepancy sequence may be generated 904 to have N/M multidimensional points. A training data set may then be selected by selecting, for each combination of categorical field values, a mapped data corpus sample for each multi-dimension point, with the mapped data corpus samples being selected from a subspace for a particular categorical field value combination. In other words, M subsets of training data (one for each combination of categorical field values) having N/M samples are selected, resulting in a training data set of N samples.

Figure 10:
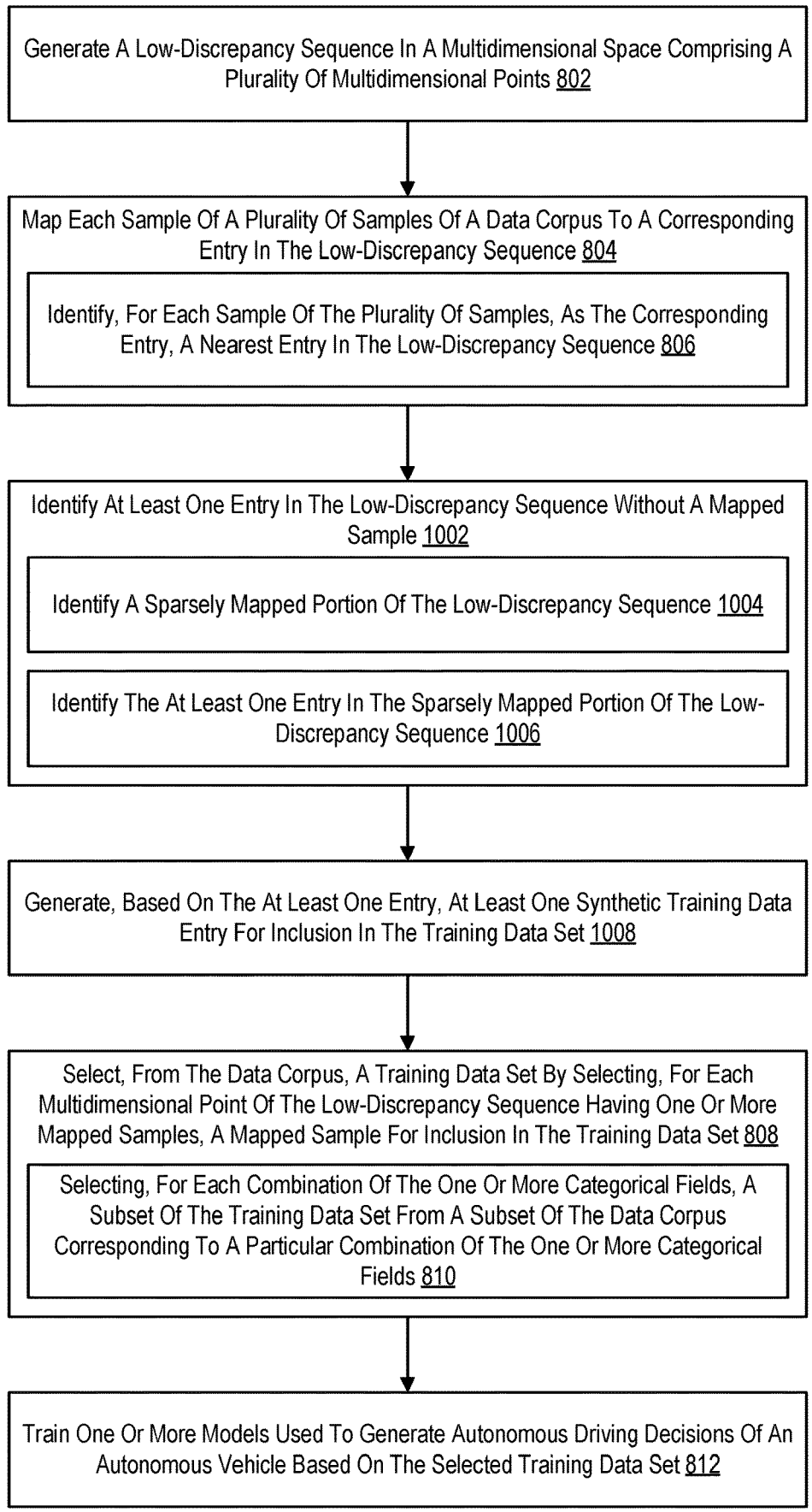
FIG. 10 is a flow chart of another example method for autonomous vehicle model training using low-discrepancy sequences according to some embodiments of the present disclosure.

For further explanation, FIG. 10 sets forth a flowchart of another example method of autonomous vehicle model training using low-discrepancy sequences according to some embodiments of the present disclosure. The method of FIG. 10 is similar to FIG. 8 in that the method of FIG. 10 also includes: generating 802 a low-discrepancy sequence in a multidimensional space comprising a plurality of multidimensional points; mapping 804 each sample of a plurality of samples of a data corpus to a corresponding entry in the low-discrepancy sequence, including identifying 806, for each sample of the plurality of samples, as the corresponding entry, a nearest entry in the low-discrepancy sequence; selecting 808, from the data corpus, a training data set by selecting, for each multidimensional point of the low-discrepancy sequence having one or more mapped samples, a mapped sample for inclusion in the training data set, including selecting 810, for each combination of categorical field values of the one or more categorical fields, a subset of the training data set from a subset of the data corpus corresponding to a particular combination of categorical field values; and training 812 one or more models used to generate autonomous driving decisions of an autonomous vehicle based on the selected training data set.

The method of FIG. 10 differs from FIG. 8 in that the method of FIG. 10 also includes identifying 1002 at least one entry in the low-discrepancy sequence without a mapped sample. As is set forth above, depending on the shape of data in the data corpus, some entries in the low-discrepancy sequence may not have any mapped sample, or may not have a mapped sample for a particular subspace of a particular combination of categorical field values. In some embodiments, identifying 1002 the at least one entry may include identifying those entries without a mapped sample (e.g., at all or for a particular subspace). Such entries are hereinafter referred to as "unmapped entries." Although some entries may be mapped in particular subspaces, an entry may still be considered unmapped with respect to some other subspace. In some embodiments, identifying 1002 the at least one entry may include identifying a subset of multiple unmapped entries. The subset of unmapped entries may be identified according to a variety of approaches, such as a random selection of unmapped entries, a percentage or proportion of unmapped entries, a number of such entries such that the number unmapped entries falls below some threshold (e.g., thresholds applicable to all entries or thresholds with respect to individual subspaces), and the like.

In some embodiments, identifying 1002 the at least one entry may include identifying 1004 a sparsely mapped portion of the low-discrepancy sequence. A sparsely mapped portion of the low-discrepancy sequence is a set or region of neighboring unmapped entries having a density (e.g., a number of included neighboring unmapped entries) exceeding some threshold. In some embodiments, the threshold may include a predefined or user-defined threshold. In some embodiments, the threshold may be based on a particular type of model of the one or more models to be trained using the training data set. For example, the threshold may be higher models used in less critical systems or with less associated risk while the threshold may be higher for models used in more critical systems. In some embodiments, the threshold may be based on the shape of the data in the sparsely mapped portion. For example, the threshold may be based on a particular dimension or dimensions in which the sparsely mapped portion of the low-discrepancy sequence are neighbors. In other words, the threshold may be based on a particular dimension or dimensions including changing, neighboring values in the neighboring unmapped entries. For example, assume that a region of neighboring unmapped entries varies in value for a particular dimension, indicating a gap in mapping of entries for that particular dimension. The threshold for identifying this region as sparsely mapped may be based on the particular value (e.g., in the data corpus) corresponding to this dimension of the low-discrepancy sequence. For example, a higher threshold may be used for a dimension corresponding to time of day, as small variations in the time of day will not materially affect the quality of selected training data. As another example, a lower threshold may be used for a dimension corresponding to braking pressure, as small variations in braking pressure may have greater impact on the training data.

Identifying 1002 at least one entry in the low-discrepancy sequence without a mapped sample may therefore also include identifying 1006 the at least one entry in the sparsely mapped portion of the low-discrepancy sequence. The at least one entry may be identified according to various approaches, including randomly, based on a predefined or dynamically calculated number of entries to be identified, and the like. As a further example, the at least one entry may be identified 1006 such that, after mapping, the density of unmapped entries (e.g., in the sparsely mapped portion) falls below a threshold, such as a threshold as described above. The method of FIG. 10 also includes generating 1008, based on the at least one entry, at least one synthetic training data entry for inclusion in the training data set. In contrast to training data selected from the data corpus, which describes a real event or moment in time (e.g., as captured by a sensor-equipped vehicle), a synthetic training data entry is programmatically generated to simulate some other data. In some embodiments, a synthetic training data entry for a particular subspace (e.g., a particular categorical field value combination) may be generated by setting one or more categorical fields to equal the particular categorical field value combination. In some embodiments, a synthetic training data entry can be generated based on a particular multidimensional point in the low-discrepancy sequence. As is set forth above, each dimension of the multidimensional points may correspond to a particular continuous field of the data corpus and/or the training data. Accordingly, in some embodiments, a synthetic training data entry can be generated by converting values of particular dimensions of the particular multidimensional point to values for their corresponding continuous fields included in training data.

In some embodiments, converting values of the multidimensional point to values for their corresponding continuous fields may include converting a value of the multidimensional point to a continuous value based on some range of for the corresponding continuous field. The range may include a predefined range constraining the continuous field, a range including a minimum and/or maximum value for the continuous field in the data corpus, and the like. In other words, converting values of the multidimensional point to values for their corresponding continuous fields may be performed by effectively reversing the scaling process described above with respect to scaling the data corpus to the multidimensional space. For example, assume that a particular multidimensional point includes a value of 0.75 corresponding to the continuous field for a lane offset. Referring to the example above, assume that lane offsets may range from −1.8 meters to 1.8 meters. Here, the value of the multidimensional point of 0.75 may be converted to a continuous value of 0.9 the lane offset continuous field.

In some embodiments, generating a synthetic training data entry may include generating other synthetic sensor data. Such other synthetic sensor data may include, for example, synthetic images or video, synthetic radar readings, synthetic LiDAR readings, and the like. The synthetic sensor data may be generated based on other fields of the corresponding synthetic training data set. In some embodiments, environmental descriptors and/or state descriptors may be provided as input for generating synthetic sensor data using one or more models, one or more simulators or rendering engines, and the like. For example, in some embodiments, environmental descriptors and/or state descriptors may be used as configuration parameters for a driving simulator or visual modeling or rendering engine to generate a simulated environment (e.g., relative to some ego vehicle). Images may then be captured or generated using the simulated environment to simulate a view of the environment from a particular camera of the ego vehicle. As another example, the environmental descriptors and/or state descriptors may be provided as input to one or more trained models configured to generate artificial images or other sensor data.

In some embodiments, the at least one synthetic training data entry may be generated 1008 by generating, for each of the identified 1002 unmapped entries, a corresponding synthetic training data entry. Thus, the unmapped entries are effectively mapped to the corresponding synthetic training data entry, thereby reducing the number of unmapped entries and reducing the density of neighboring unmapped entries. This improves the overall quality of a selected training data set as the model as it may be preferable to train a model on synthetic data for a particular scenario rather than no data.

Figure 11:
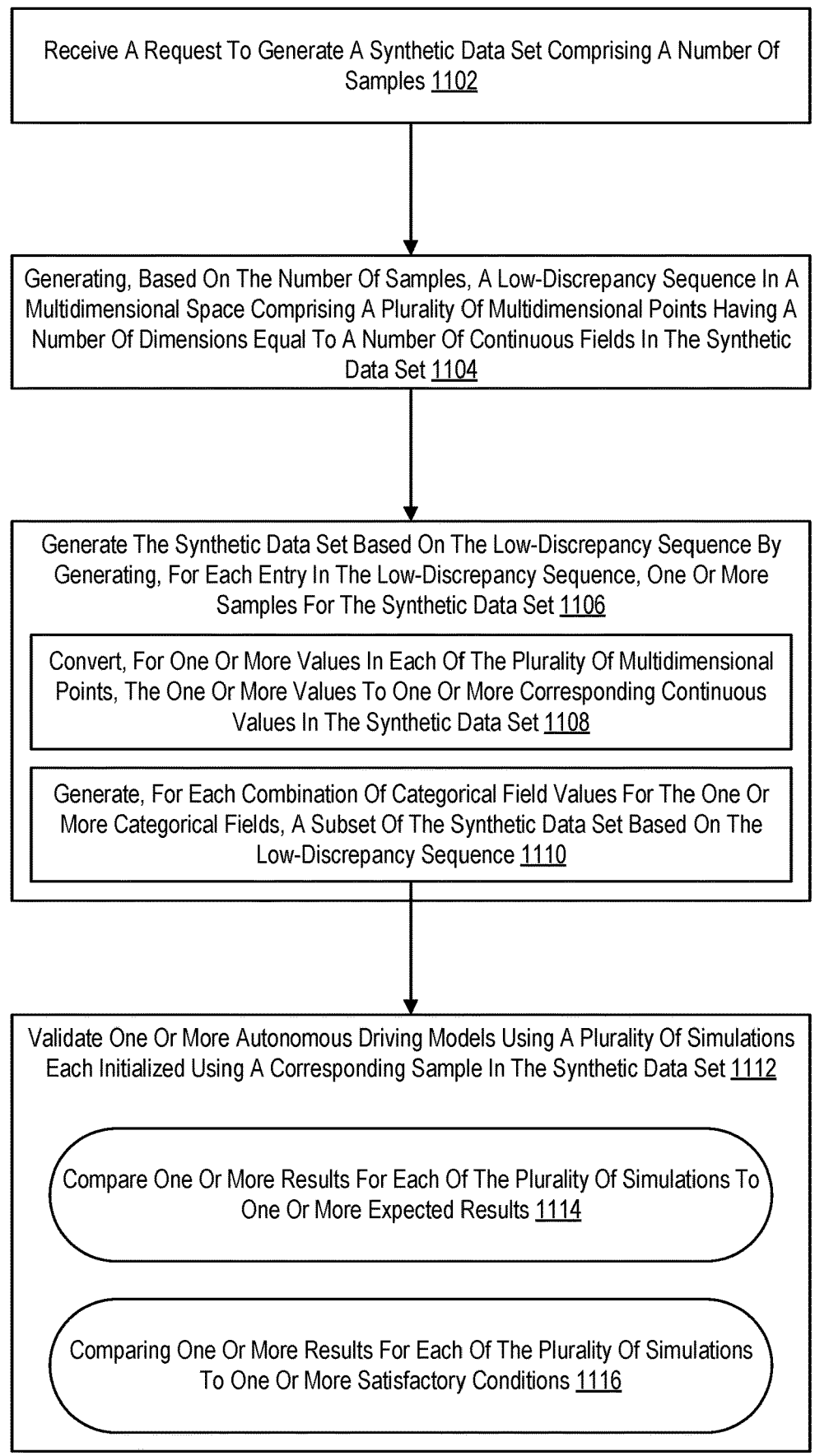
FIG. 11 is a flow chart of another example method for autonomous vehicle model validation using low-discrepancy sequences according to some embodiments of the present disclosure.

For further explanation, FIG. 11 sets forth a flowchart for another method of autonomous vehicle model validation using low-discrepancy sequences according to some embodiments of the present disclosure. The method of FIG. 11 may be performed, for example, by an execution environment such as the execution environment of FIG. 7, or another system of computing devices or compute resources as can be appreciated. The method of FIG. 11 includes receiving 1102 a request to generate a synthetic data set comprising a number of samples. A synthetic data set is similar to a synthetic training data set as described above in that the synthetic data set is a programmatically generated data set. As an example, the synthetic data set may include a set of samples (e.g., simulated samples) replicating a portion of a data corpus as described above. For example, the synthetic data set may include environmental descriptors and/or state descriptors as described above with respect to a vehicle. In some embodiments, the request may indicate a particular schema for the synthetic data set. For example, some embodiments, the request may indicate particular fields to be included in or excluded from the synthetic data set. As another example, the request may include an identifier or selection of a particular predefined schema for a synthetic data set.

As will be addressed in further detail below, in some embodiments, the synthetic data set may be used to initialize a simulation, such as for a simulated driving environment. Accordingly, in some embodiments, the synthetic data set may include additional, fewer, or different fields than the data corpus described above. For example, the synthetic data set may include categorical fields indicating a number of vehicles proximate to an ego vehicle, categorical fields indicating the placement (e.g., relative placement, lane placement) of the other vehicles, and the like. The synthetic data set may also include continuous fields for behavioral characteristics of the ego vehicle, such as velocity, amounts of acceleration or braking applied, degrees of wheel and/or tire rotation, angle or heading, and the like. The synthetic data set may also include continuous fields defining road characteristics and/or interactions between the ego vehicle and the road, such as road slope or slant, degrees of friction between the road and the ego vehicle, a weight of the ego vehicle, and the like.

The method of FIG. 11 also includes generating 1104, based on the number of samples, a low-discrepancy sequence in a multidimensional space comprising a plurality of multidimensional points having a number of dimensions equal to a number of continuous fields in the synthetic data set. The low-discrepancy sequence includes a low-discrepancy sequence as is described above, such as a Sobol sequence. Here, the low-discrepancy sequence is in a multidimensional space having a number of dimensions equal to a number of continuous fields of the synthetic data set. Thus, each dimension of the low-discrepancy sequence corresponds to a particular continuous field of the synthetic data set. In some embodiments, the low-discrepancy sequence is based on the number of samples indicated in the request in that the low-discrepancy sequence includes a number of multidimensional points (e.g., entries) equal to the number of samples indicated in the request. Thus, each sample in the synthetic data set may correspond to a particular entry of the low-discrepancy sequence. In some embodiments, such as where the synthetic data set includes one or more categorical fields, the low-discrepancy sequence is based on the number of samples indicated in the request in that the low-discrepancy sequence includes a number of entries equal to the number of samples indicated in the request divided by a number of combinations of categorical field values. For example, a request for N samples of a synthetic data set having M categorical fields each having P possible values, the low-discrepancy sequence may be generated to have N/(M*P) entries.

The method of FIG. 11 also includes generating 1106 the synthetic data set based on the low-discrepancy sequence by generating, for each entry in the low-discrepancy sequence, one or more samples for the synthetic data set. A synthetic data set sample may be generated from an entry in the low-discrepancy sequence according to similar approaches as are set forth above with respect to generating a synthetic training data entry from an entry in the low-discrepancy sequence. For example, in some embodiments, generating 1106 the synthetic data set may include converting 1108, for one or more values in each of the plurality of multidimensional points, the one or more values to one or more corresponding continuous values in the synthetic data set. In other words, each value in a multidimensional point (e.g., for each dimension) is converted to a continuous value for its corresponding continuous field in the synthetic data set.

In some embodiments, the synthetic data set may include one or more categorical fields. Accordingly, in some embodiments, generating 1106 the synthetic data set may include generating 1110, for each combination of categorical field values for the one or more categorical fields, a subset of the synthetic data set based on the low-discrepancy sequence. Each combination of categorical field values may define a particular subspace of the synthetic data set. A subset of the synthetic data set may be generated by generating, for that particular subspace (e.g., for that particular combination of categorical field values), a synthetic data set entry for each multidimensional point of the low-discrepancy sequence. For example, assuming a low-discrepancy sequence of N entries and M combinations of categorical field values, a synthetic data set of N*M entries may be generated. Thus, each entry in the low-discrepancy sequence is used to generate, for each combination of categorical field values, a synthetic data set entry. A particular synthetic data set entry may therefore include continuous field values converted from their values in the corresponding entry of the low-discrepancy sequence, as well as categorical field values equal to the combination of categorical field values of their particular subset/subspace.

The method of FIG. 11 also includes validating 1112 one or more autonomous driving models using a plurality of simulations each initialized using a corresponding sample in the synthetic data set. Each synthetic data set entry may include values usable as configuration parameters for a simulated driving environment. In a simulated driving environment, a simulated ego vehicle may be driven using autonomous driving models. The values of a synthetic data set entry may be used to define, in the simulated driving environment, an environment relative to the ego vehicle (e.g., a number and placement of other vehicles on the road, particular characteristics of the road, lighting or weather conditions). The values of a synthetic data set entry may be used to define, in the simulated driving environment, various attributes and behavioral characteristics of a simulated ego vehicle, such as the weight, steering angle, starting velocity, starting acceleration or deceleration, heading), or location in the road (e.g., which lane and/or how centered in the lane). Using a particular simulation initialized using a particular synthetic data set entry, the simulation may be executed whereby the simulated ego vehicle controlled by one or more autonomous driving models operates in the simulated environment as initialized in order to validate the one or more autonomous driving models.

Validating 1112 the one or more autonomous driving models may be performed according to a variety of approaches, independently or in combination. In some embodiments, validating 1112 the one or more autonomous driving models may include comparing 1114 one or more results of each of the plurality of simulations to one or more expected results. A result of a given simulation may describe a state of the ego vehicle and/or the environment when the simulation has ended (e.g., due to meeting one or more conditions defining conclusion of the simulation). The result of a given simulation may also describe various metrics or other data points aggregated or measured during the simulation.

Comparing 1114 one or more results of each of the plurality of simulations to one or more expected results may therefore be used to determine whether the one or more autonomous driving models performed (e.g., caused the simulated ego vehicle) to perform as expected, such as by determining whether particular actions were performed, or whether other conditions expected to be satisfied were satisfied. For example, assume that, for a given simulation, an expected result is that the ego vehicle performs a lane change operation. Comparing 1114 the results may then include determining whether the ego vehicle performed the lane change operation as expected.

In some embodiments, validating 1112 the one or more autonomous driving models may include comparing 1116 one or more results of each of the plurality of simulations to one or more satisfactory conditions. The one or more satisfactory conditions are criteria that, if met, may validate or contribute to validation of the one or more autonomous driving models. For example, the one or more satisfactory conditions may include collision avoidance, acceleration or deceleration falling within particular thresholds, collision damage or force of impact falling below particular thresholds, adherence to particular laws or safety rules, and the like.

As is described above, the low-discrepancy sequence provides for an evenly distributed set of multidimensional points in the multidimensional space. Synthetic data sets generated using the low-discrepancy sequence are therefore evenly distributed in the multidimensional space. Moreover, the synthetic data set is evenly distributed across each subspace defined by the categorical field values. This allows for simulations to be performed across an evenly distributed set of initial states defined by the synthetic data set. Models may then be validated across an evenly distributed and evenly covered set of scenarios, providing for more thorough and complete validation for models.

In view of the explanations set forth above, the benefits of autonomous vehicle model training and validation using low-discrepancy sequences according to embodiments of the present disclosure include: evenly distributed training data for training autonomous driving models and evenly distributed validation of autonomous driving models, resulting in improved performance of an autonomous vehicle.

Exemplary embodiments of the present disclosure are described largely in the context of a fully functional computer system for autonomous vehicle model training and validation using low-discrepancy sequences. The present disclosure also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others. Any computer system having suitable programming means will be capable of executing the steps of the method of the disclosure as embodied in a computer program product. Although some of the exemplary embodiments described in this specification are oriented to software installed and executing on computer hardware, nevertheless, alternative embodiments implemented as firmware or as hardware are well within the scope of the present disclosure.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood that any of the functionality or approaches set forth herein may be facilitated at least in part by artificial intelligence applications, including machine learning applications, big data analytics applications, deep learning, and other techniques. Applications of such techniques may include: machine and vehicular object detection, identification and avoidance; visual recognition, classification and tagging; algorithmic financial trading strategy performance management; simultaneous localization and mapping; predictive maintenance of high-value machinery; prevention against cyber security threats, expertise automation; image recognition and classification; question answering; robotics; text analytics (extraction, classification) and text generation and translation; and many others.

It will be understood from the foregoing description that modifications and changes may be made in various embodiments of the present disclosure without departing from its true spirit. The descriptions in this specification are for purposes of illustration only and are not to be construed in a limiting sense. The scope of the present disclosure is limited only by the language of the following claims.

What is claimed is:

1. A method comprising:
   receiving a request to generate a synthetic data set comprising a number of samples, wherein each sample of the synthetic data set is encoded as record comprising a plurality of field-value pairs, wherein the plurality of field-value pairs comprise one or more environmental descriptors for an environment relative to a vehicle and one or more state descriptors describing a state of the vehicle;
   generating, based on the number of samples, a low-discrepancy sequence in a multidimensional space comprising a plurality of multidimensional points having a number of dimensions equal to a number of continuous fields in the synthetic data set;
   generating the synthetic data set based on the low-discrepancy sequence by generating, for each entry in the low-discrepancy sequence, one or more samples of the synthetic data set; and
   validating one or more autonomous driving models using a plurality of simulations each initialized using a corresponding sample in the synthetic data set.

2. The method of claim 1, wherein each sample of the synthetic data set comprises a plurality of continuous fields each corresponding to a dimension of the multidimensional space.

3. The method of claim 2, wherein generating the synthetic data set comprises converting, for one or more values in each of the plurality of multidimensional points, the one or more values to one or more corresponding continuous values in the synthetic data set.

4. The method of claim 2, wherein each sample in the synthetic data set further comprises one or more categorical fields.

5. The method of claim 4, wherein generating the synthetic data set comprises generating, for each combination of categorical field values of the one or more categorical fields, a subset of the synthetic data set based on the low-discrepancy sequence.

6. The method of claim 4, wherein the one or more categorical fields comprises one or more of: a lane position of an ego vehicle or a number of other vehicles relative to the ego vehicle.

7. The apparatus of claim 4, wherein generating the synthetic data set comprises generating, for each combination of categorical field values of the one or more categorical fields, a subset of the synthetic data set based on the low-discrepancy sequence.

8. The apparatus of claim 4, wherein the one or more categorical fields comprises one or more of: a lane position of an ego vehicle or a number of other vehicles relative to the ego vehicle.

9. The method of claim 2, wherein the plurality of continuous fields comprise one or more of: one or more vehicle behavior characteristics of an ego vehicle, a road characteristic, a position of one or more other vehicles relative to the ego vehicle, or one or more behavioral characteristics for the one or more other vehicles.

10. The apparatus of claim 2, wherein generating the synthetic data set comprises converting, for one or more values in each of the plurality of multidimensional points, the one or more values to one or more corresponding continuous values in the synthetic data set.

11. The apparatus of claim 2, wherein each sample in the synthetic data set further comprises one or more categorical fields.

12. The apparatus of claim 2, wherein the plurality of continuous fields comprise one or more of: one or more vehicle behavior characteristics of an ego vehicle, a road characteristic, a position of one or more other vehicles relative to the ego vehicle, or one or more behavioral characteristics for the one or more other vehicles.

13. The method of claim 1, wherein validating the one or more autonomous driving models comprises comparing one or more results for each of the plurality of simulations to one or more expected results.

14. The method of claim 1, wherein validating the one or more autonomous driving models comprises comparing one or more results for each of the plurality of simulations to one or more satisfactory conditions.

15. The method of claim 1, wherein the low-discrepancy sequence comprises a Sobol sequence.

16. The apparatus of claim 1, wherein each sample of the synthetic data set comprises a plurality of continuous fields each corresponding to a dimension of the multidimensional space.

17. The apparatus of claim 1, wherein validating the one or more autonomous driving models comprises comparing one or more results for each of the plurality of simulations to one or more expected results.

18. The apparatus of claim 1, wherein validating the one or more autonomous driving models comprises comparing one or more results for each of the plurality of simulations to one or more satisfactory conditions.

19. The apparatus of claim 1, wherein the low-discrepancy sequence comprises a Sobol sequence.

20. An apparatus comprising at least one processor and memory storing instructions that, when executed, cause the at least one processor to perform steps comprising:
    receiving a request to generate a synthetic data set comprising a number of samples, wherein each sample of the synthetic data set is encoded as record comprising a plurality of field-value pairs, wherein the plurality of field-value pairs comprise one or more environmental descriptors for an environment relative to a vehicle and one or more state descriptors describing a state of the vehicle;
    generating, based on the number of samples, a low-discrepancy sequence in a multidimensional space comprising a plurality of multidimensional points having a number of dimensions equal to a number of continuous fields in the synthetic data set;
    generating the synthetic data set based on the low-discrepancy sequence by generating, for each entry in the low-discrepancy sequence, one or more samples of the synthetic data set; and
    validating one or more autonomous driving models using a plurality of simulations each initialized using a corresponding sample in the synthetic data set.

\* \* \* \* \*